United States Patent
Yang et al.

(12)

(10) Patent No.: US 11,036,250 B2
(45) Date of Patent: Jun. 15, 2021

(54) DATACENTER STABILIZATION OF REGIONAL POWER GRIDS

(71) Applicant: Microsoft Technology Licensing, LLC, Redmond, WA (US)

(72) Inventors: Weiwei Yang, Seattle, WA (US); Christopher Miles White, Seattle, WA (US); Kateryna Lytvynets, Redmond, WA (US); Darren Keith Edge, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/460,344

(22) Filed: Jul. 2, 2019

(65) Prior Publication Data
US 2021/0004035 A1    Jan. 7, 2021

(51) Int. Cl.
*G05F 1/66* (2006.01)
*H02J 3/14* (2006.01)
(Continued)

(52) U.S. Cl.
CPC .............. *G05F 1/66* (2013.01); *G06Q 50/06* (2013.01); *H02J 3/14* (2013.01); *G05B 15/02* (2013.01); *H02J 3/003* (2020.01)

(58) Field of Classification Search
CPC .... G05F 1/66; G06Q 50/06; H02J 3/14; H02J 3/003; G05B 15/02
See application file for complete search history.

(56) References Cited

U.S. PATENT DOCUMENTS

| | | | |
|---|---|---|---|
| 2012/0245753 A1* | 9/2012 | Forbes, Jr. | H02J 3/14 700/295 |
| 2014/0018969 A1* | 1/2014 | Forbes, Jr. | G05B 15/02 700/295 |

(Continued)

FOREIGN PATENT DOCUMENTS

| | | |
|---|---|---|
| EP | 3316209 A1 | 5/2013 |
| WO | 2019075186 A1 | 4/2019 |

OTHER PUBLICATIONS

"Aurecon Hornsdale Power Reserve Impact Study 2018", https://www.scribd.com/document/395050069/Aurecon-Hornsdale-Power-Reserve-Impact-Study-2018, Retrieved Date: May 12, 2019, 33 Pages.

(Continued)

*Primary Examiner* — Ziaul Karim
(74) *Attorney, Agent, or Firm* — Schwegman Lundberg & Woessner, P.A.

(57) ABSTRACT

A system and method for regulating charge/discharge of a battery to stabilize a regional power grid includes a regulation control module that monitors a frequency regulation signal from the regional power grid and market conditions for obtaining power from the regional power grid. A machine learning module predicts from the frequency regulation signal and market conditions a future beneficial period when the battery may be exposed to the regional power grid to charge/discharge power in accordance with the frequency regulation signal to stabilize the regional power grid through participation in the regulation of the regional power grid. Another machine learning module calculates a regulation control signal that tracks the frequency regulation signal during the future beneficial period and outputs the regulation control signal to at least one battery control module that manages charging/discharging of the battery to selectively (Continued)

withdraw/apply power from/to the regional power grid during the future beneficial period.

20 Claims, 19 Drawing Sheets

(51) Int. Cl.
   *G06Q 50/06* (2012.01)
   *G05B 15/02* (2006.01)
   *H02J 3/00* (2006.01)

(56) References Cited

U.S. PATENT DOCUMENTS

| | | | | |
|---|---|---|---|---|
| 2014/0052308 | A1* | 2/2014 | Hanafusa | H02J 13/0079 700/295 |
| 2015/0127425 | A1* | 5/2015 | Greene | H02J 3/32 705/7.31 |
| 2016/0370819 | A1* | 12/2016 | Forbes, Jr. | G05B 17/02 |
| 2017/0102433 | A1 | 4/2017 | Wenzel et al. | |
| 2017/0170684 | A1* | 6/2017 | Matthey | H02J 7/0068 |
| 2020/0112170 | A1* | 4/2020 | Wang | H02J 3/14 |

OTHER PUBLICATIONS

"International Search Report and Written Opinion Issued in PCT Application No. PCT/US20/033887", dated Sep. 17, 2020, 11 Pages.

Hasiballah, et al., "Battery Management System: An Overview of Its Application in the Smart Grid and Electric Vehicles", In Journal of IEEE Industrial Electronics Magazine vol. 7, Issue 2, Jun. 1, 2013, 13 Pages.

"International Search Report and Written Opinion issued in PCT Application No. PCT/U520/033896", dated Aug. 6, 2020, 8 Pages.

* cited by examiner

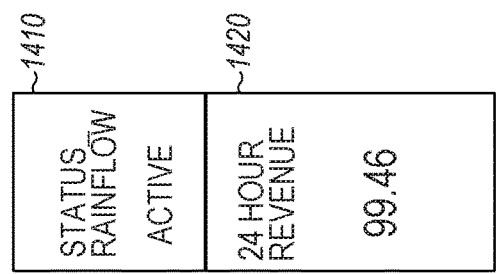
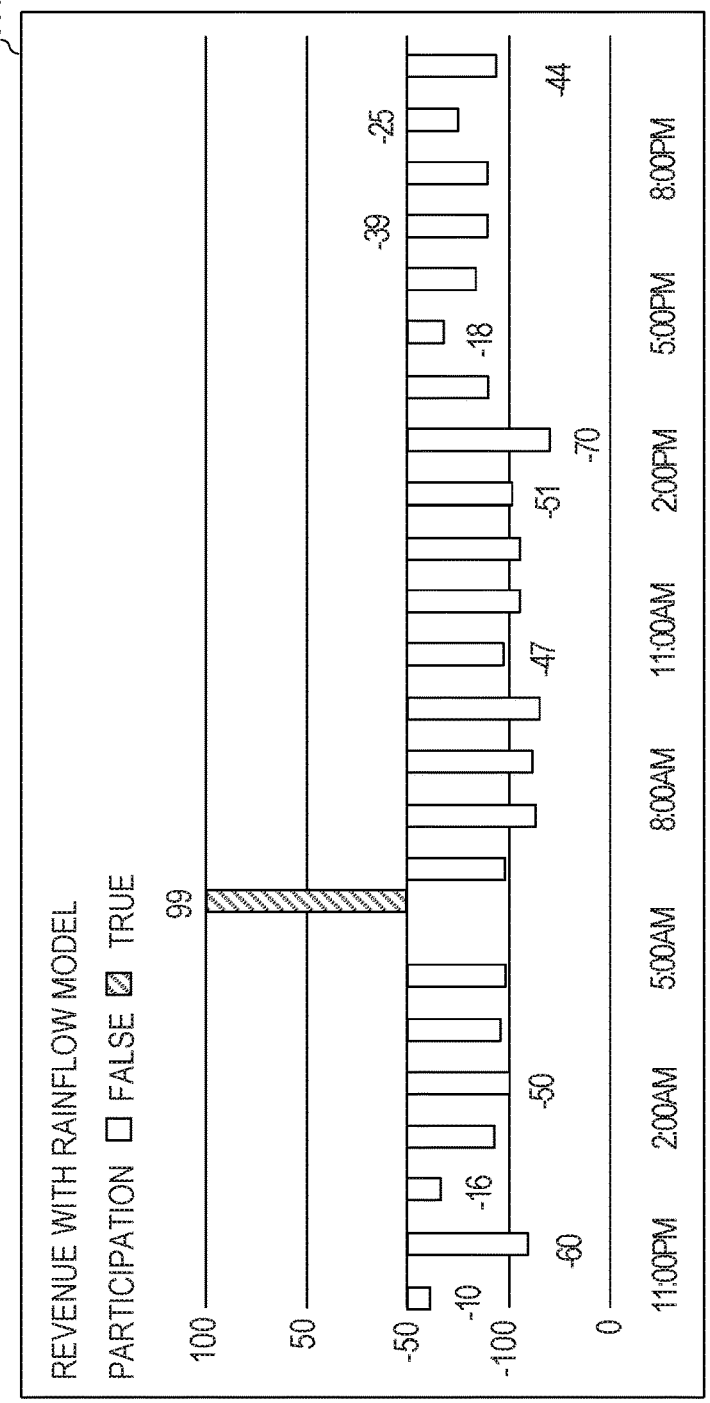
FIG. 13
FIG. 14

DATACENTER STABILIZATION OF REGIONAL POWER GRIDS

BACKGROUND

All energy markets have frequency regulation services to correct short term discrepancies between the amount of power available and the load on the system to ensure constant power frequency and thus the stability of the power grid. The demand for frequency regulation will increase as power systems use more renewable energy sources such as solar and wind. As it is impossible to predict instantaneous weather conditions, it is also impossible to control second-to-second power generation from these sources. Current participants in the regulation market are either carbon-based power plants that are taken offline and used to supply regulation services only or dedicated battery storage facilities, such as the Hornsdale Power Reserve, built for this sole purpose. These facilities represent a significant hidden cost to adapting renewable energy sources to the power grid.

SUMMARY

Various details for the embodiments of the inventive subject matter are provided in the accompanying drawings and in the detailed description text below.

The techniques described herein provide a way of participating in an area's frequency-regulation energy market by using the components of datacenters, such as backup batteries, cooling systems, compute load balancing, throttling, scheduling systems, and backup power generators using diesel, natural gas or other means. In sample embodiments, Machine Learning (ML), in the form of LSTM (long short-term memory) based prediction models, is used to forecast the stability of the region's power grid and to optimally orchestrate operations of the datacenter components in a manner designed to stabilize the region's power grid. For example, the datacenter may change the temperature of the cooling system, charge and discharge the backup batteries, balance and schedule computing loads, etc. based on the calculated prediction models. The result is an online control system that dynamically matches the power-usage profile of the datacenter against regulation signals, thereby enabling the datacenter to participate in the frequency regulation market without requiring any additional hardware or datacenter facilities.

In sample embodiments, the systems described herein are implemented in control modules for battery banks and uninterruptible power supply (UPS) devices. A new control module is provided to determine when to enable the charge/discharge cycles of the batteries to selectively withdraw power from the power grid. The new control module includes software for controlling when the system is active for responding to the frequency regulation signal from the power grid and hardware responsive to battery regulation signals from the new control module that switches the batteries for charge/discharge cycles.

In sample embodiments, a computer-implemented method is described for using a battery (e.g., datacenter backup batteries) to stabilize a regional power grid. The method includes monitoring a frequency regulation signal from the regional power grid and market conditions for obtaining power from the regional power grid and predicting from the frequency regulation signal and market conditions a future beneficial period when the battery may be exposed to the regional power grid to charge/discharge power in accordance with the frequency regulation signal to stabilize the regional power grid through participation in the regulation of the regional power grid. A regulation control signal is also calculated that tracks the frequency regulation signal during the future beneficial period, and the regulation control signal is used during the future beneficial period to charge/discharge the battery. The regulation control signal may also be used to adjust power usage of a backup generator, cooling and ambient temperatures of a datacenter, and load balancing of computing operations of the datacenter.

In the sample embodiments, the market conditions include a discrepancy between available power from the regional power grid and a load on the regional power grid and/or a performance score that measures how well a participant in regulation of the regional power grid performs frequency regulation services. Predicting the future beneficial period may further include predicting a benefit of participation in regulation of the regional power grid during a prospective participation period relative to costs of participation in regulation of the regional power grid during the prospective participation period. For example, the costs of participation in regulation of the regional power grid during the prospective participation period may include predicted battery degradation due to charging and discharging of the battery as determined using a battery degradation cost model. Predicting the future beneficial period may also include predicting a black-out event and/or a grid equipment failure event. In the sample embodiments, a machine learning prediction model is used to forecast energy-market stability of the regional power grid from at least the market conditions. The machine learning prediction model may comprise a long short-term memory machine learning based prediction model that forecasts regulation service payout from energy market-specific historical data.

In the sample embodiments, a dashboard is provided that displays to a user at least the predicted future beneficial period for participation in regulation of the regional power grid and actual market payout for participation in regulation of the regional power grid during a prior participation period.

In other sample embodiments, a system is described for regulating the charge/discharge of a battery to stabilize a regional power grid. The system includes a battery (e.g., datacenter backup batteries) and a regulation control module that monitors a frequency regulation signal from the regional power grid and market conditions for obtaining power from the regional power grid. The regulation control module includes a machine learning module that predicts from the frequency regulation signal and market conditions a future beneficial period when the battery may be exposed to the regional power grid to charge/discharge power in accordance with the frequency regulation signal to stabilize the regional power grid through participation in the regulation of the regional power grid. The regulation control module further includes a machine learning module that calculates a regulation control signal that tracks the frequency regulation signal during the future beneficial period and that outputs the regulation control signal during the future beneficial period to manage charging/discharging of the battery. At least one battery control module is also provided to manage the charging/discharging of the battery in response to the regulation control signal to selectively withdraw/apply power from/to the regional power grid.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter. Rather, it will be understood that the following section provides summarized examples of some of the embodiments described in the Detailed Description below.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 10 illustrates a sample dashboard display for monitoring operation of the frequency regulation energy market in a sample embodiment where

FIG. 13 illustrates a display of the Revenue With Rainflow Model chart of FIG. 10A.

FIG. 14 illustrates a display of the Rainflow Model Current Status chart of FIG. 10A.

DETAILED DESCRIPTION

Figure 1:
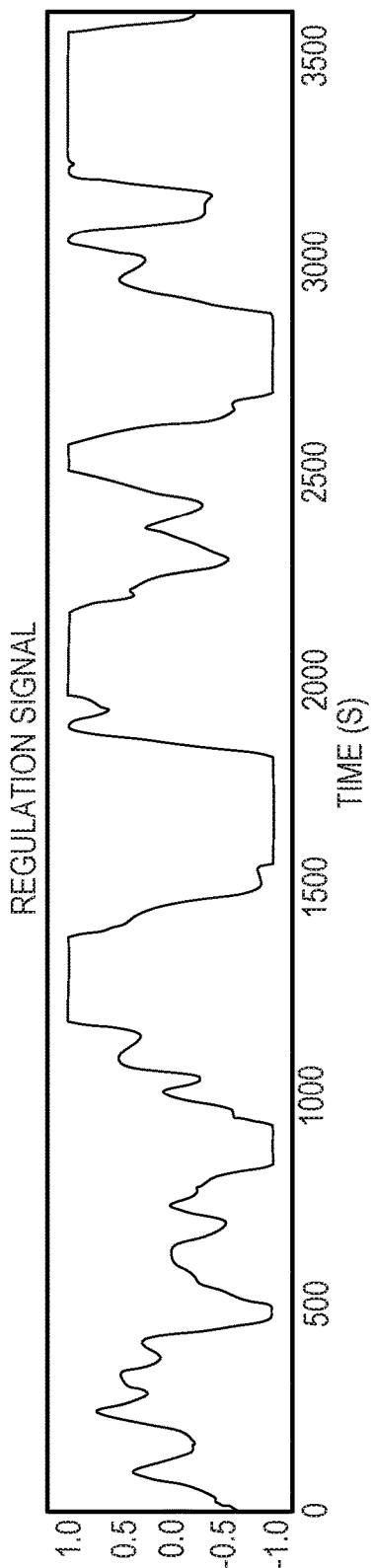
FIG. 1 illustrates a graph of a sample regulation signal for the power grid, which updates every 2 seconds and is highly variable (though designed to have a 0 mean every 15 minutes).

The following description with respect to FIGS. 1-23 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Overview

The present inventors have recognized that datacenter components such as backup batteries, cooling systems, compute load balancing, throttling, scheduling systems, and backup power generators may be used to stabilize the energy grid, without providing additional hardware or building a new site, so long as the participation is managed to minimize component degradation and to maximize energy market stability in a cost-effective manner. Machine learning (ML) in the form of a LSTM (long short-term memory) prediction model forecasts demands and dispatches datacenter operations and services to achieve the same results as having dedicated facilities for the regulation market, without disrupting regular datacenter operations and customer service level agreements (SLAB). An immediate payout from the energy regulation market could partially or even entirely offset the operating cost of the datacenter. Also, and more importantly, the system described herein will provide stability to the power grid in any region where implemented and will allow that region to use more renewable energy and bring down overall energy costs over time.

A multi-panel dashboard provides a holistic view of the system and allows operators to monitor the accuracy of the forecaster and online control dispatcher as well as the overall health of the regulation system. In sample embodiments, such a dashboard incorporates a forecaster, live market data, and internal component status to forecast participation efficacy and to support the decision to participate in the energy market. In a participation period, a live frequency regulation signal and a control response to the frequency regulation signal is displayed. Post-participation results of payout benefits and predicted wear-and-tear degradation costs to the participation components are displayed in both aggregate and for the preceding participation period.

In the sample embodiments described herein, datacenters are used to stabilize the power grid in a region. It will be appreciated that the techniques described herein may also be used in other power producing environments such as dedicated battery storage facilities and renewable energy facilities. In the sample embodiments described herein, components commonly found in datacenters, such as backup batteries, cooling systems, natural gas/diesel generators, compute load balancing and throttling systems are used to smooth short-term discrepancies between an area's power generation and system load and to reduce frequency irregularities and peak energy consumption without impacting regular datacenter operations. In a particular sample embodiment, backup batteries are used to participate in the frequency regulation market under the appropriate circumstances.

A machine learning (ML)-based system forecasts energy market stability and uses forecast results to dispatch datacenter operations to maximize energy market stability, without affecting the datacenter operations. The ML-based system may, for example, predict when it would be profitable and effective to participate in the frequency regulation market using backup batteries. In such circumstances, the ML-based system provides online control of the datacenter backup batteries and perhaps other datacenter hardware or software components to respond to high-frequency high-variation regulation signals to ensure optimal signal tracking and to minimize battery degradation.

Battery Regulation System

In the United States, a frequency regulation market exists in 7 of the 10 energy wholesale markets and in all 7 of the energy wholesale markets operated by ISO (independent system operators) or RTO (regional transmission organizations). Rules of participation might differ, but the idea behind each frequency regulation market is the same—to stabilize the power grid. Without it, the utility or (power) line 50 Hz or 60 Hz frequency would get out of control for a region, equipment connected to the grid could get destroyed, and unexpected blackouts would occur. This issue is getting worse, and people are more at risk to such events as renewable energy sources, such as solar and wind, get more prevalent. Since no one can predict weather down to the second, there is no guarantee of constant energy production.

Current participants in the energy regulation market use hardware and facilities dedicated for that purpose. For example, Tesla opened a 100-MW capability battery bank (Hornsdale Power Reserve) in South Australia in 2018 and, within a few months of operation, it had completely stabilized the local energy grid and reduced peak energy cost by up to 90%. Tesla built this battery bank for the sole purpose of regulation.

In the regulation market, the operator outputs an automated regulation signal (e.g., Regulation D or Regulation A signals) of the type illustrated in graph form in FIG. 1 showing the value of a regulation signal versus time for the Pennsylvania Jersey Maryland (PJM) market. It will be appreciated that the rules explained herein are specific to the PJM market but that similar rules would apply in other energy regulation markets. The regulation signal updates every 2 seconds and is highly variable (though designed to have a 0 mean every 15 minutes). The signal varies between $-1$ and $+1$. $-1$ means there is excess energy in the grid, and suppliers need to withdraw energy to stabilize the power grid. $+1$ means there is shortage in the system and suppliers need to throttle their energy usage to stabilize the power grid. The suppliers bid their regulation capabilities 1 day ahead of time, and 1-hour prior to opt in or out of participation. Then, during the participation period, suppliers are rated based on how accurately they can follow the frequency regulation signal (e.g., rated on accuracy, delay, and precision of response). Suppliers with a performance score less than 25% would not get paid for the participation period, and with an accumulated performance score less than 40% would be dropped from the program.

Compensation to the suppliers depends on the suppliers' ability to follow the automated frequency regulation control signal. The payout for participating in the PJM market, for example, is based on several factors, such as capability clearing prices, performance clearing prices, and mileage ratio (where mileage is the absolute sum of movement of the regulation signal in a given time period and the mileage ratio measures the relative movement requested from regulating resources following different signals). Such data is unpredictable, and there is generally no clear pattern in the data. For example, the capability clearing price has the highest variability and, according to 2018 PJM regulation market data, may vary from a single dollar all the way to 1400 or more per hour. The performance clearing price has less variability but no clear pattern. Also, the clearing prices are unknown to the suppliers prior to the participation period, and the payouts are settled after the participation periods. So, with the high variability of the clearing prices, there is a high variability in payouts as well.

Datacenters provide a significant percentage of worldwide energy consumption, currently projected at 1% and expected to grow dramatically over the next decade. Moreover, the datacenter components, such as backup battery systems, are expensive and wasteful. For example, if 3 minutes of backup batteries must be available before power generators can kick in in case of a power outage, the backup batteries need to have 3 minutes of capacity at end of life, which means that when they are new, they are capable of supplying up to 15 minutes of power. Those extra minutes are considered "unallocated." Because batteries naturally degrade even when unused, in this case, the unused cycles are truly wasted. Datacenter energy usage and equipment costs thus represent a significant expense to the datacenter operator.

Using ML to forecast the efficacy of participation prior to entering into a regulation period, and avoiding participation during periods deemed unfavorable, will safeguard datacenter equipment from unnecessary wear-and-tear and maximize long-term effectiveness. Current regulation market sellers bid to participate with little or no regards to the large variation in regulation demands and payouts for participation. Blindly participating causes premature degradation of equipment and increases the capital cost of participation. The ML forecaster described herein is trained using market-specific historical data and datacenter-specific operational cost data and is adaptable to all markets and participation components. Anyone who participates in the regulation market, whether using datacenter components or dedicated site and hardware, may use the forecasting system to maximize performance.

A key input into the system is the frequency regulation signal posted by the energy grid operator. The frequency regulation signal quickly varies, with new signals posted as frequently as every two seconds. Due to the nature of the energy grid, with loads being constantly added and/or shed, and energy added and consumed at unpredictable times, it is impossible to predict the future frequency regulation signal and thus it is impossible to optimize a response to ensure best tracking while staying within the safe operational limits for participation components. Greedily following the regulation signal until hitting system limits reduces efficacy. Accordingly, the inventors have trained an ML-based online control system from the historical regulation signal and its offline-solved optimal control response to develop an ML-based online control system that dispatches component control signals to manage energy usage of the components based on the current regulation signal and the status of the system. It outperforms greedy control and can be continually trained online to adapt to future changes in regulation signal shifts. By contrast, rule-based heuristics would need to rely on humans to explicitly hand craft rules which would neither scale nor capture changes in regulation signal characteristics.

In sample embodiments, the ML-based online control system is modeled as a constrained optimization that maximizes the payout while following the regulation signal and minimizing the cost of battery degradation. The state of charge of the battery is updated based on a linear differential equation, where the next state is based on the previous state plus current charge/discharge, while constraining the rate of charge/discharge between 0 and the maximum battery power, and the state of charge between the min/max allowed state of charge. The battery degradation cost is a negative term in the model representing the cost to participate. However, the system is not tied to any specific battery model. Since these are short/shallow cycles, instead of the traditional full charge/discharge cycles, it is unclear how one would model the batteries in this case. The following models are proposed.

Linear Battery Cost Model

Figure 2:
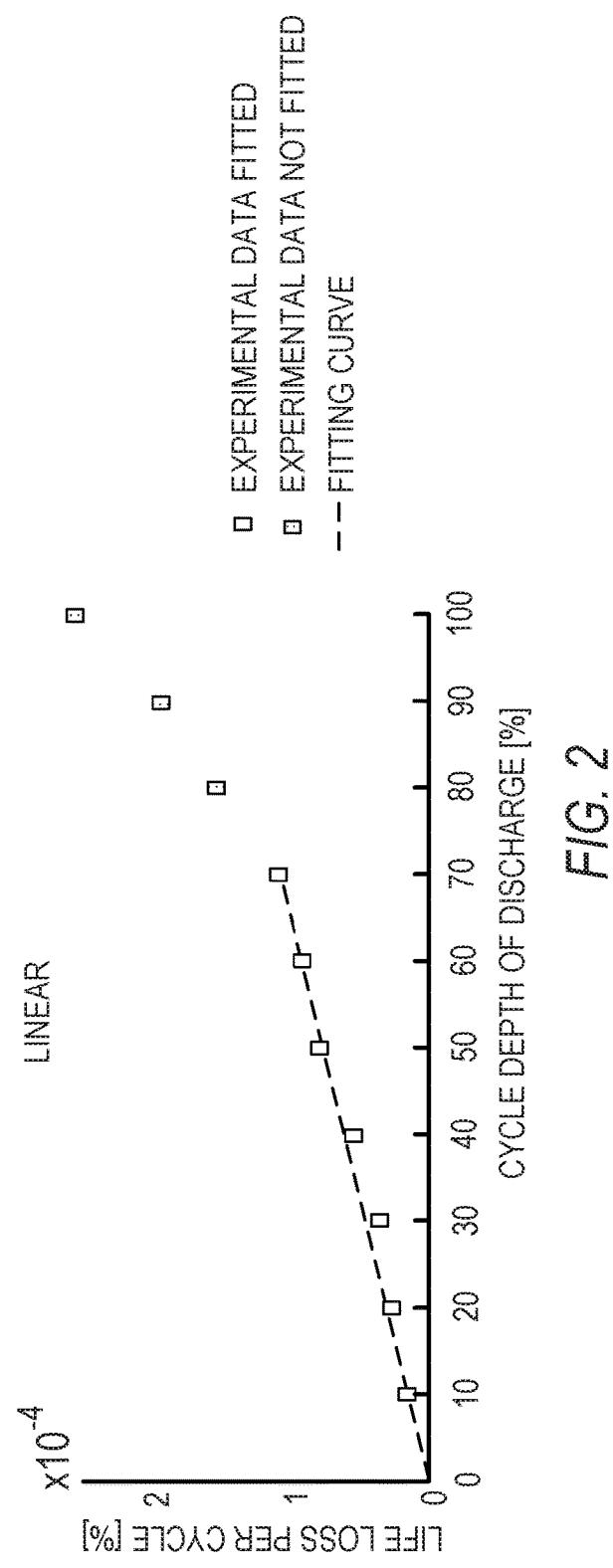
FIG. 2 illustrates a graph of a Linear model used in sample embodiments to amortize the cost of the battery over its lifetime of total cycles.

In sample embodiments, a Linear model of the type illustrated in FIG. 2 is implemented in a regulation control module (FIG. 8) to amortize the cost of the battery over its lifetime of total cycles. To estimate the operational cost of a battery under a Linear degradation model, it is assumed that the battery is capable of N number of charge cycles before reaching end-of-life (EoL). N is usually established by battery manufacturers via lab testing. The battery cell cost is pro-rated into a per-MWh cost with respect to charge/discharge energy that the battery is capable of, defining $\lambda_b$ as the coefficient of linearized battery degradation costs. If the battery is limited to operation within a specific range of depth of discharge (DoD), to avoid over charge and discharge, then it can be assumed the degradation cost is linear to the amount of charge and discharge. As such, the cost of the battery following the regulation signal would be $f(b) \propto \lambda_b |b(t)|$ where $|b(t)|$ is the magnitude (absolute value) of the regulation signal at time t.

For example, the following Linear function $f(b)$ may be used:

$$f(b) \propto \lambda_b |b(t)|$$

$$\lambda_b = \frac{\lambda_{cell} \cdot 10^6}{2N \cdot (SoC_{max} - SoC_{min})}$$

$$\lambda_{cell} \sim \$300 \text{ kWh} \quad SoC_{max} = 0.8$$

$$\lambda_b = 83.33 \quad N = 3000 \quad SoC_{min} = 0.2$$

In this example, it is assumed a battery has a lifetime of 3000 charge cycles (circa 10 years of battery life at 1 cycle per day), with a battery cost defined as $\lambda_{cell} = \$300$ kWh that is operated within a state of charge (SoC) of 0.2 to 0.8, then:

$$\lambda_b = \frac{0.3 \cdot 10^6}{(2 \cdot 3000 \cdot (0.8 - 0.2))} = 83.33$$

If the regulation signal of FIG. 1 is followed fully for one hour, where the signal is posted every 2 seconds ($\Delta t = 2$ s or 1/1800 hour), then the operational cost would be:

$$\text{cost} = \lambda_b \sum_0^t |b| \Delta t = 83.33 \cdot \sum |b| \cdot 1/1800 = \$46.45$$

Therefore, the cost to follow the above example signal would be $46.45 under the Linear battery cost model.

Rainflow Battery Cost Model

Figure 3:
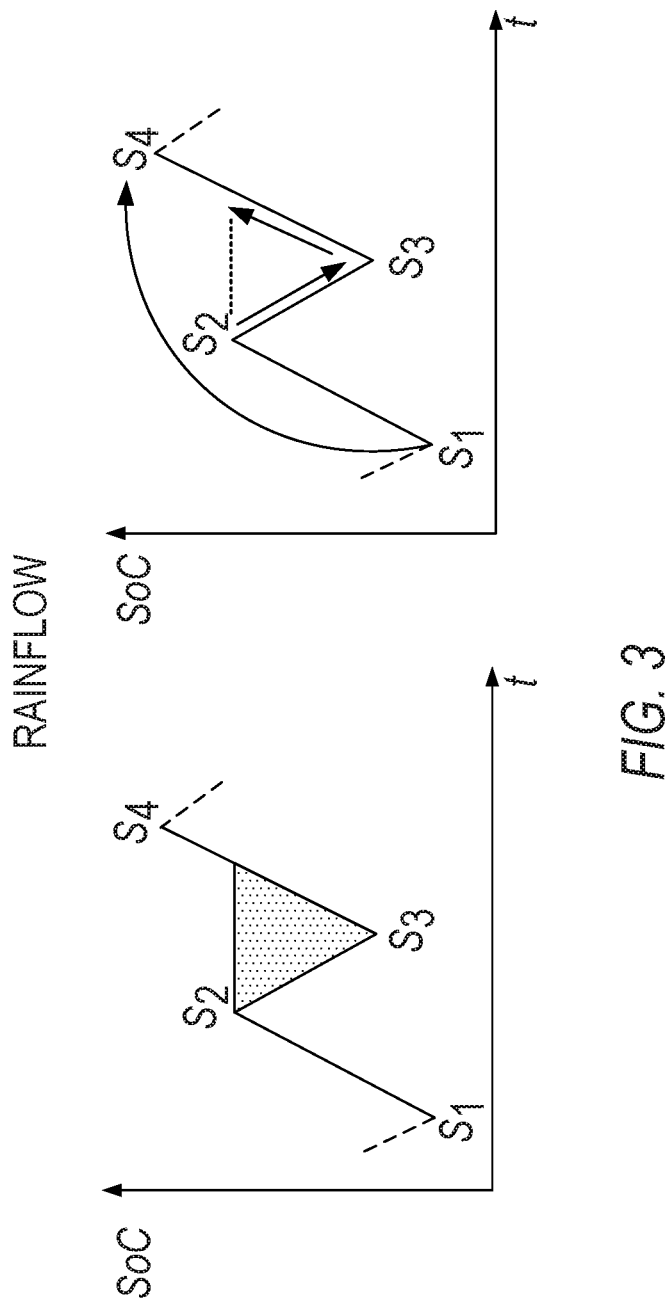
FIG. 3 illustrates a graph of a Rainflow cycle counting model used in sample embodiments to amortize the cost of the battery.

A Rainflow cycle counting model of the type illustrated in FIG. 3 may also be implemented in a regulation control module (FIG. 8) to amortize the cost of the battery over its lifetime of total cycles. The Rainflow cycle counting model is based on material stress where the stress cycles are counted using the Rainflow cycle counting method and the cost of the stress is calculated based on a stress function where x is the state of charge (SoC) of the battery and w, v are depth of charge/discharge under the Rainflow counting model. $w_i$ and $v_i$ are charge/discharge at cycle i. The calculation is thus:

$$(v, w) = \text{Rainflow}(x)$$

$$\Delta L(v, w) = \sum_{i=1}^{|v|} \frac{\Phi(v_i)}{2} + \sum_{i=1}^{|w|} \frac{\Phi(w_i)}{2}$$

$$\Phi(u) = \alpha u^\beta$$

It is noted that the charge and discharge depth do not have to be symmetrical, thus it is represented as separate terms, w and v, for completeness. L is the cost of operating the battery under a stress function, which is the sum of the stresses incurred by charge/discharges ($w_i$ and $v_i$). $\Phi$ is the stress function, in this case exponential stress functions, where $\alpha$, $\beta$ are stress constants usually generated by fitting battery test results.

These or any other appropriate models known to those skilled in the art could all be used as the cost term of the battery in the battery degradation cost model. Also, a more holistic modeling approach may be used that takes the entire system into account, using realistic hourly changing market clearing prices, and focusing on forecasting.

Payout Prediction Model

Figure 4:
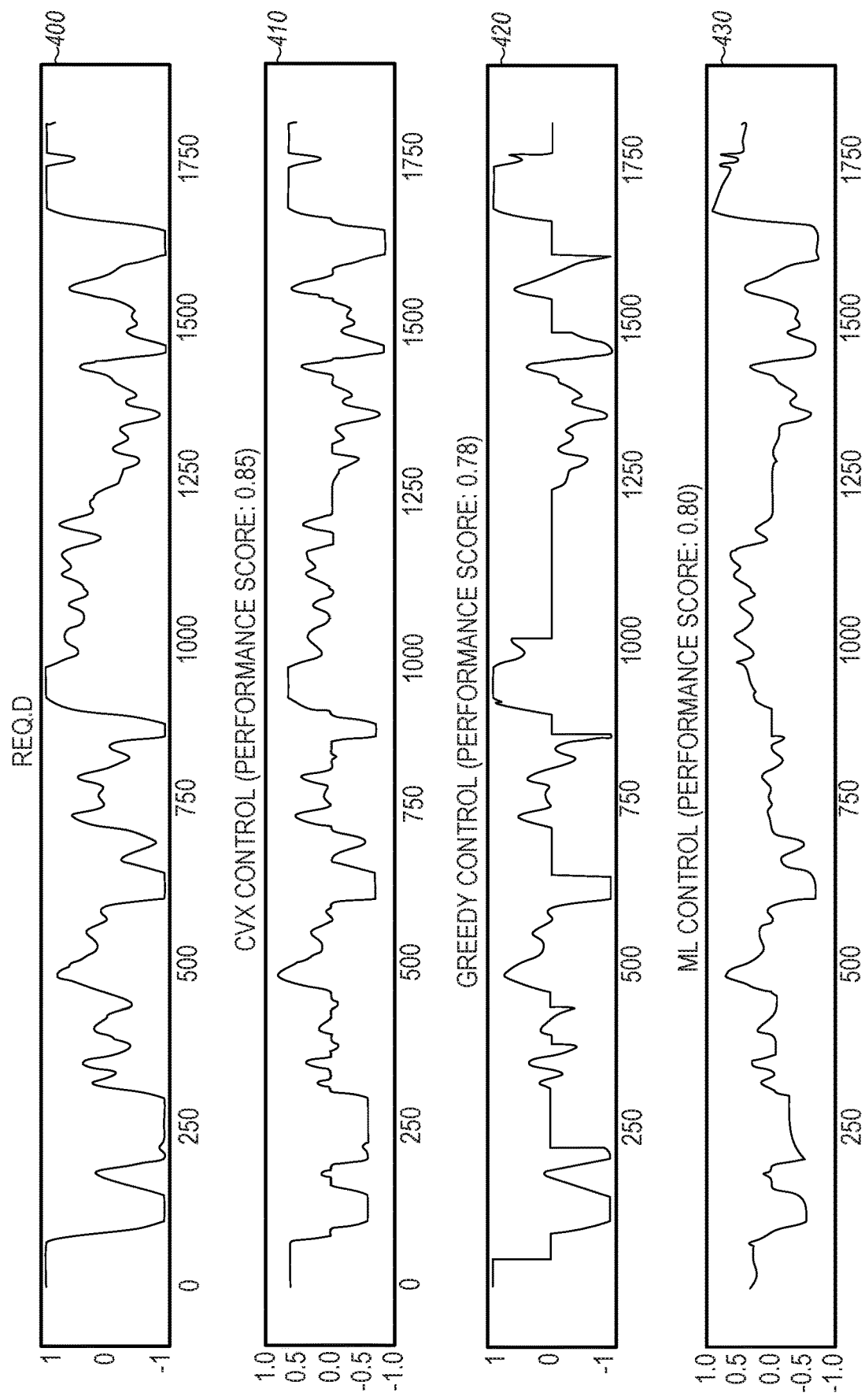
FIG. 4 illustrates from top to bottom graphs of the regulation signal (Reg-D) and the convex solver (cvx) control, greedy control, and ML control signals calculated to track the regulation signal.

If the entire regulation signal s known during a participation period, a convex solver can be used to find the optimized battery control based on the equation below for the state of charge R FIG. 4 illustrates from top to bottom the regulation signal (Reg-D) 400 and the optimized control signal generated using a convex optimization solver 410, greedy control signal 420, and ML control signals 430. Since the regulation signal is posted every 2 seconds and is considered stochastic, it is impossible to generate an optimized instantaneous online control response. On the other hand, it is possible to use a convex optimization solver to find the optimized control post a regulation period when the entire regulation signal 400 is known for that period. If the system greedily follows the regulation signal 400 until constraints such as max/min state of charge are hit, the system performs less optimally both in terms of payout and battery degradation, as illustrated by the greedy control signal 420. Accordingly, the methods described herein leverage Machine Learning to train an optimized online battery control system. As such, there are many methods that can be used to train the online battery control module. Sample embodiments described herein train the afore-mentioned ML-based online control system based on long short-term memory (LSTM) (i.e., is trained on the previous regulation signal and its convex solutions) to generate an ML control signal 430. This ML-control approach improves on the greedy approach and provides a control strategy that can be implemented in either hardware or software to dispatch battery capability.

In a sample embodiment, a long short-term memory (LSTM) based online battery control is implemented. The LSTM network is trained by, for example, taking half a year (43800 hours) of PJM RegD training data randomly sampled from the 2018 actual PJM RegD signals, broken into one-hour intervals, where each interval represents a regulation period. Since regulation signals are designed to have a 0 mean every 15 min, it is possible to generate synthetic signals to increase training size. For example, since regulation signal ranges between −1 and +1 with a 0 mean every 15 min (450 samples at 2 second per sample), for one hour of synthetic signal, 1800 random numbers may be generated based on this distribution attribute. The current time in seconds during a regulation period, ranging from 0 to 3600 is provided. The state of charge of corresponding batteries at each time during the regulation period while following regulation signal is provided. Other factors, such as battery temperature at each time during regulation period, may also be provided. The corresponding optimized battery response given a battery degradation model is solved using a convex solver.

For example, the state of charge (R) for charge (c), discharge (d), and rate of charge/discharge (r) for energy (E) and maximum power (P) may be defined by the system of equations used by a convex solver. In the following, the first equation for maximizing R is the objective function to be maximized. R is the revenue of regulation based on charge (c), discharge (d), and regulation signal (r), f(c,d) is the cost of battery based on charge/discharge, and x is the state of charge (SoC) of the battery. Its update is based on previous state ($x_{t-1}$) plus the charge ($c_t$) and discharge ($d_t$) of the battery at the current time t. The state of charge is constrained to the max and min state of charge, and the rate of charge/discharge rate is constrained by the power rating of the battery. E is the energy rating of the battery, and $n_c$ and $n_d$ are charge/discharge efficiency coefficient. Thus:

$$\max_{c,d} R(c, d, r) - f(c, d)$$
$$\text{s.t. } x_t = x_{t-1} + \frac{\mathcal{T}\eta_c}{E}c_t - \frac{\mathcal{T}}{\eta_d E}d_t,$$
$$\underline{x} \leq x_t \leq \overline{x},$$
$$0 \leq c_t \leq P,$$
$$0 \leq d_t \leq P,$$

The input training features (defined below) are fed into an LSTM network with the solutions from the convex solver as the target for a multivariate time series forecast with a window of 15 minutes (window size is a hyper parameter that can be tuned). The trained network attempts to predict the optimized battery control, following as close to the convex solved solution as possible, given the current time, battery state of charge, and regulation signal. The ML control signal 430 in FIG. 4 is an example of the resulting battery control curve.

On the other hand, if the battery is large enough, ML online battery control may not be needed since the battery is capable of following the entire regulation signal. However, for small batteries, it is important to have such control.

Since the clearing prices vary drastically, if one were to participate every period, a lot of money could be lost because the cost of the battery is much larger than the payout of the market. As a result, it is important to be able to predict when to participate in the energy market. Since the payout pricing reflects the utility of regulation, predicting the profitability of a participation period is a way to predict the benefits of providing regulation services.

The payout is calculated after the participation period, and is based on clearing price, mileage ratio and participation performance score. During the participation period, regulation service providers are scored based on how well they follow the regulation signal in terms of correlation, precision and delay. This score is called the performance score.

Each energy market has its own way of calculating payout and performance scores. For instance, the formulas the regional transmission organization PJM (Pennsylvania Jersey Maryland Interconnection LLC) uses to calculate payouts and performance scores are presented in their operating manuals and agreements. In general, the payout may be simplified as the sum of clearing prices weighted by the performance score. For example, an operator using 1 megawatt (MW) of battery capacity to follow the Reg-D signal (FIG. 4 top) with the battery dispatch response (FIG. 4 cvx control) would achieve a performance score of 0.85. Assuming, for the above example, the capability clearing price is $52, performance clearing price is $12, and mileage ratio is 2.3, then the payout would be defined as:

payout=performance score·capability clearing price+ performance score·performance clearing price·mileage ratio Thus;

payout=(1·85·52+0.85·(12·2.3)=67.66

If linear battery cost is assumed to be calculated using the Linear battery cost model described above, then the profit or loss for the given participation period is calculated as follows:

profit=payout−battery cost=67.66−46.45=$21.21

Since clearing prices, mileage ratio, regulation signal, performance score and cost to battery are unknown prior to a participation period, this profit calculation can only be done after the participation period. However, a regulation operator must opt in before a regulation period to participate. As such, a predictive model is used to predict if profits could be made by participating in the period.

Analysis of the 2018 PJM regulation market shows that there is little to no seasonal or time-based patterns in clearing prices or mileage ratio. Given the large variance and implied stochasticity of these features, a profitable period can only be found in around 10% of participation periods under the Rainflow battery degradation models and 30% of participation periods under the Linear battery degradation models. Thus, predicting the profitable periods is advantageous, particularly for the Rainflow battery degradation model. The process of predicting a favorable participation period should be universally beneficial to anyone planning to enter the regulation market; however, the specific methods used for prediction can change depending on market conditions. In the 2018 PJM regulation market, the capability clearing price dominated payout and ranged from $0-$1300 per hour (perhaps due to irregularities in the design of clearing price calculations) which made it natural to use rare event forecasting methods. This may not hold for every market or year to year behaviors in the same market. Also, the forecast ability is not limited to a dollar profit of payout. The same principle can be applied to forecast other things, such as the most beneficial period to participate in order to stabilize the grid due to external aspects such as weather, fire, equipment, grid instability, etc. In sample embodiments, favorable times to participate in the regulation market include not only times when the profit is predicted to be favorable but also times during which a black-out event or grid equipment failure events are predicted.

Input training features used in forecasting a prediction target such as a binarized classifier suggesting favorability of participating in the energy market include any or all of the following:

Market factors (e.g., capability, performance clearing prices, mileage ratio);
Energy production and load in a regulation zone during matching regulation period;
Aggregated weather conditions in regulation zone (e.g., temperature, windspeed, rainfall);
Internal datacenter factors (e.g., power usage, compute load, cooling temperature);
Hourly statistic attributes of the regulation signal (e.g., mean, median, absolute values of the signal);
Performance scores for participation periods;
Other variant factors during a participation period; and
Previous payouts.

Figure 5:
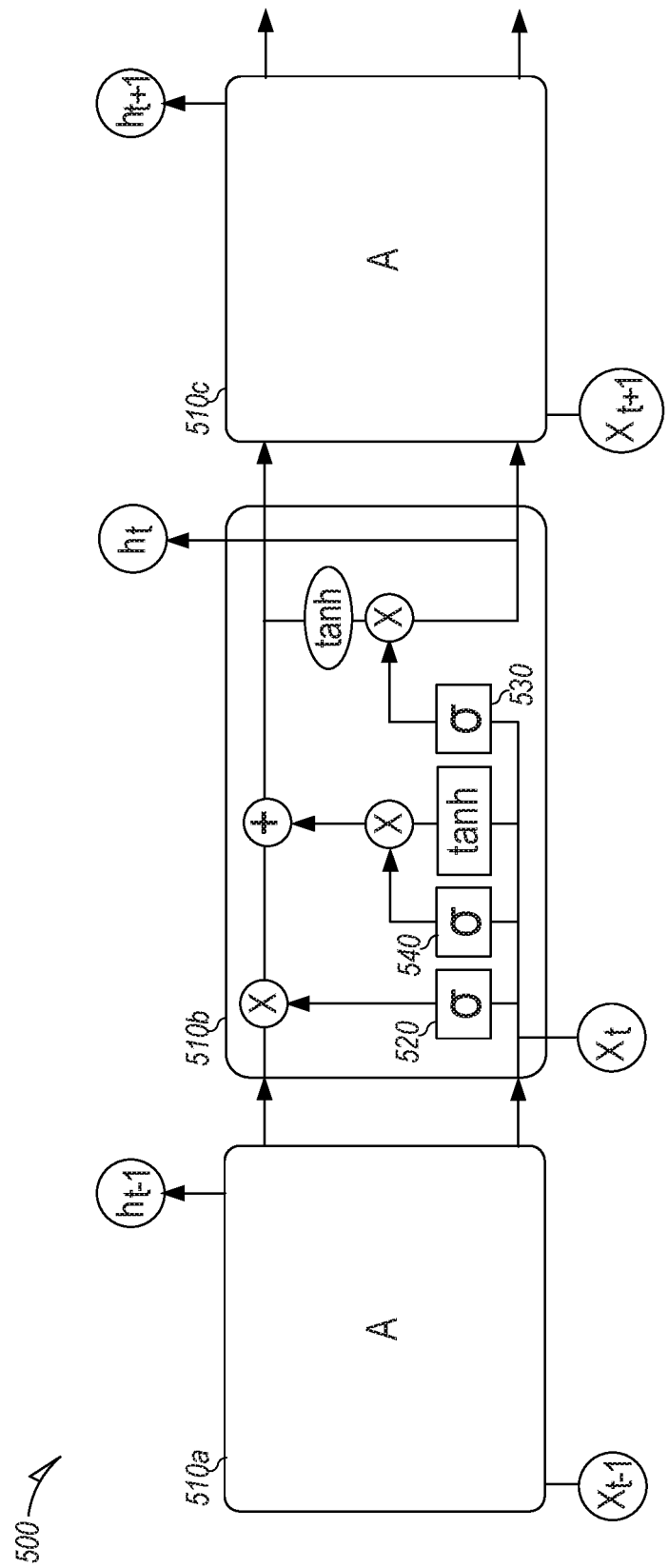
FIG. 5 illustrates a circuit diagram of an example of a long short-term memory (LSTM) based deep learning prediction model in a sample embodiment.

FIG. 5 illustrates an example of the prediction model in a sample embodiment. As illustrated, an LSTM (long short-term memory) based deep learning model 500 is provided. The LSTM 500 has a plurality of neurons (cells) 510a, 510b, 510c, etc. that process data sequentially and pass a previous state as a parameter (e.g., $x_{t-1} \to x_t \to x_{t+1}$) and output values $h_{t-1}$, $h_t$, and $h_{t+1}$, respectively. As known to those skilled in the art, LSTM networks are a form of recurrent neural network (RNN) architecture that has feedback connections and are usually used on sequential or time series data. As suggested by the name, these models extract long and short-term features from input data. An LSTM network includes a series of cells 510 composed together into layers, where each cell 510 has an input gate 520, output gate 530, and forget gate 540 as illustrated in FIG. 5.

Each cell 510 remembers values over arbitrary time intervals and the three gates regulate the flow of information into and out of the cell 510. The cell 510 is responsible for keeping track of the dependencies between the elements in the input sequence. The input gate 520 controls the extent to which a new value flows into the cell 510, the forget gate 540 controls the extent to which a value remains in the cell 510, and the output gate 530 controls the extent to which the value in the cell 510 is used to compute the output activation of the LSTM network 500. There are connections into and out of the LSTM gates, a few of which are recurrent. The weights of these connections, which are learned during training, determine how the gates operate.

Figure 6:
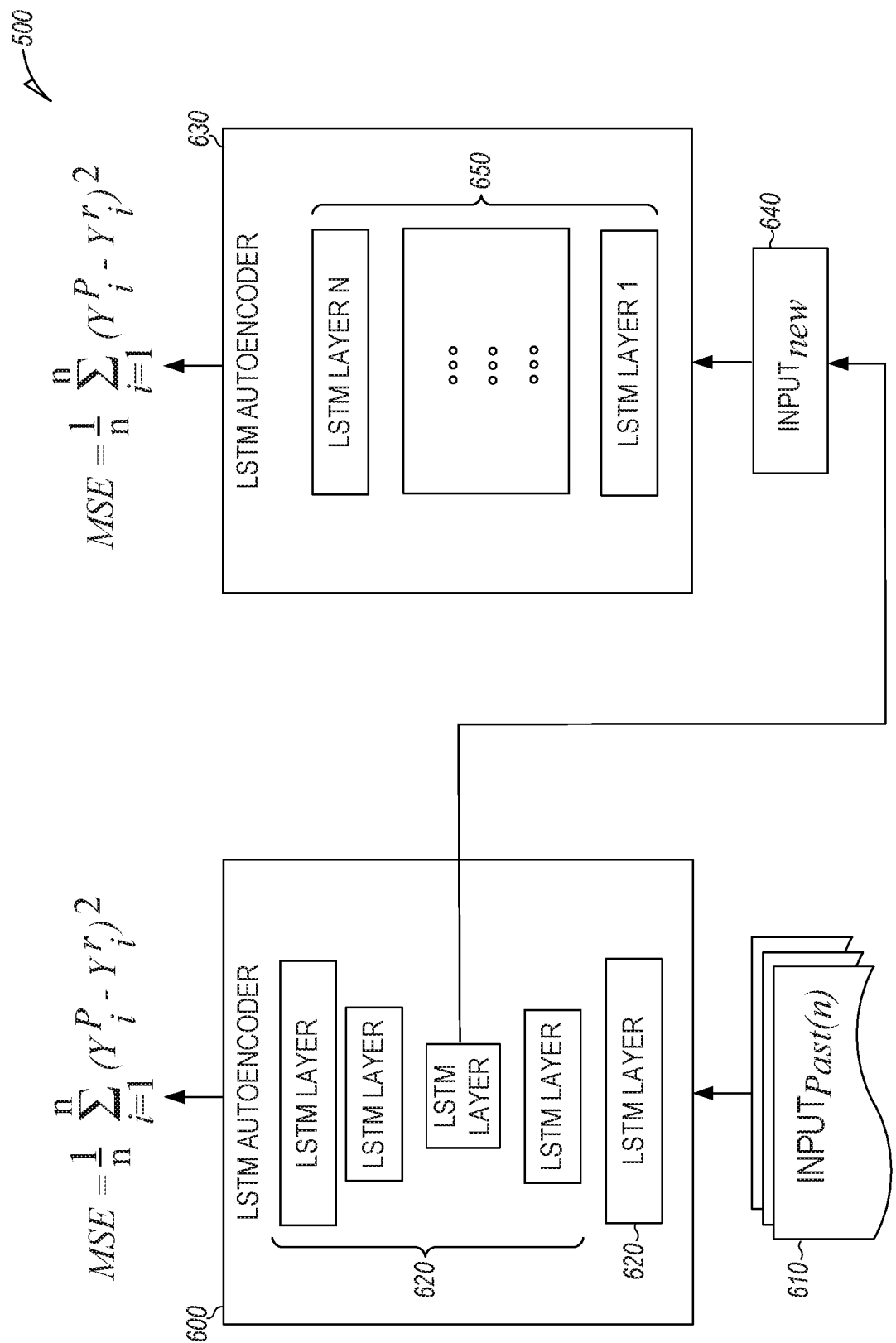
FIG. 6 illustrates a conceptualized circuit diagram of the respective stacks of the LSTM prediction model of FIG. 5 in a sample embodiment.

FIG. 6 illustrates the respective stacks of the LSTM 500, including an LSTM autoencoder 600 that receives past values as inputs 610, processes the inputs 610 through multiple LSTM layers 620, and feeds the results into a second LSTM stack 630 that averages incoming vectors and concatenates with new inputs 640 using multiple LSTM layers 650. Input features to the model are the capability clearing price, performance clearing price, mileage ratio, performance score of previous period, and mean of the regulation signal amplitude. It will be appreciated by those skilled in the art that autoencoders are neural networks used to learn an efficient representation (encoding) of the data by solving $f(x)=x$, where $f(x)$, or the encoded data, has less dimensionality than x. How well an autoencoder encodes the original data can be measured by an error function, such as the standard mean squared error (MSE) function:

$$\frac{1}{n}\sum_{i=1}^{n}(f(x_i)-x_i)^2$$

It will be appreciated that, in this case, the MSE also happens to be the objective function (aka cost, lost function) that is being minimized during training of the auto-encoder. However, after training, the same MSE function is also provided a measurement of the quality of encoding at each sample point ($x_i$) and that becomes an input signal in the second LSTM stack 630. So, the objective in the first step is not only to produce the best encoding with the smallest MSE, but also to provide error metrics to be used in the next step.

In a sample embodiment, a multi-layer LSTM based autoencoder 600 is built to encode the input multi-variant time series where the exact dimension of the encoding is a hyper parameter of the network. In general, regular data can be expected to be well encoded by the LSTM autoencoder 600, thus having a lower RMS; however, extreme events are badly captured by the LSTM autoencoder 600 and thus have a higher RMS. Both the encoded data as well as their RMS can be taken as input and fed into another multi-layer LSTM stack 630 and used to predict the targeted payout. While a binarized prediction may be taken directly from the second LSTM stack 630, further refinements are taken on the predictor to enable the flexibility of setting a cutoff threshold without having to re-train the overall model. The output of the model 500 is a prediction of the expected revenue payout of the next participation period. Other input features also may be incorporated, such as weather, time-varying operational cost, and the like.

This is only an example of a network, and there are many other ways to build a network to handle this task. For example, another possible network would be a wavelet net, auto-encoder-error-based rare-event classification. The key is that the network is capable of predicting the state of the energy grid based on historic data and then dispatch control signals to the datacenter based on this prediction.

Figure 7:
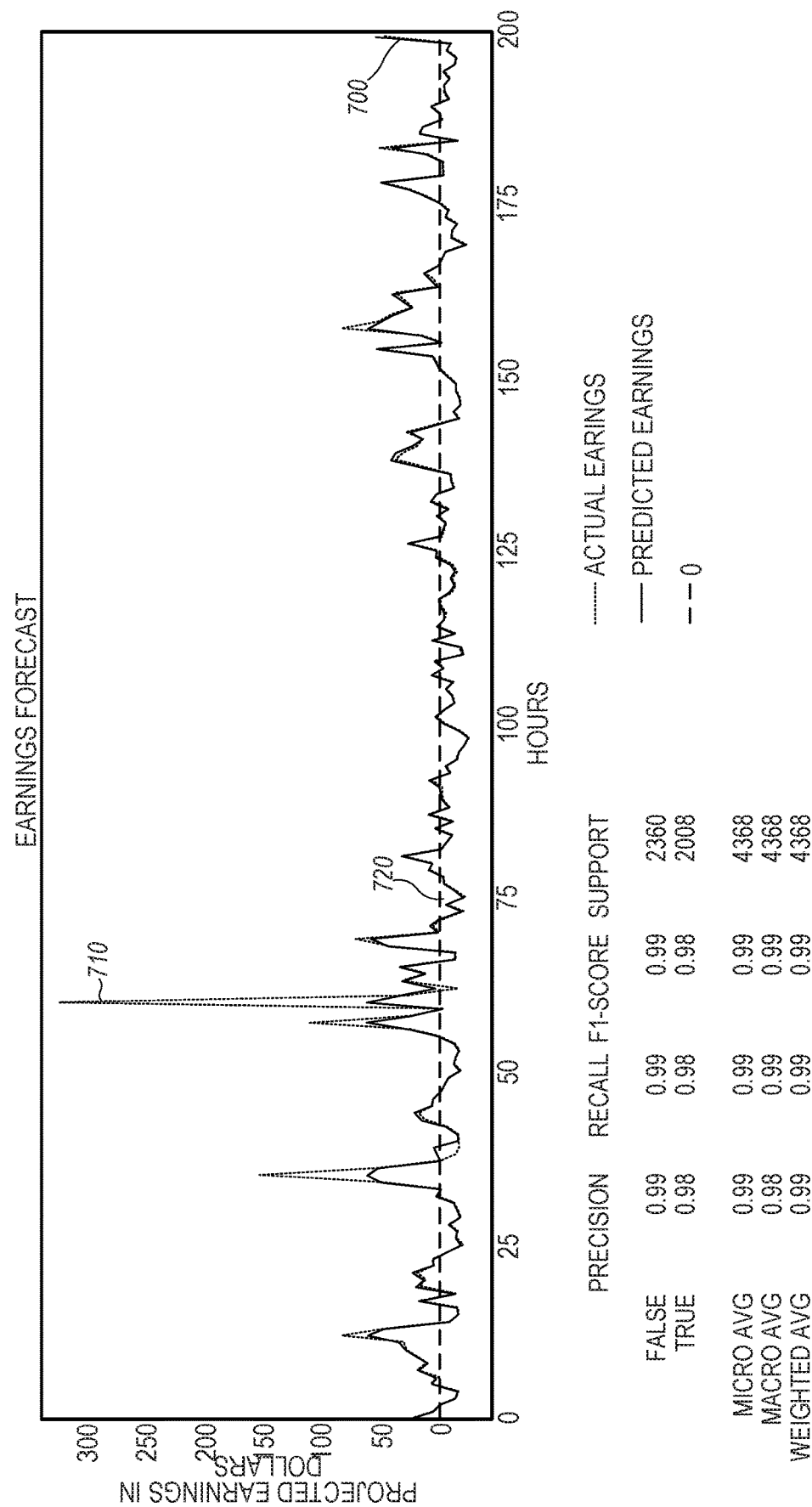
FIG. 7 illustrates a graph of an example result of the ML-based online control system's Linear and Rainflow forecasting models in a sample embodiment.

FIG. 7 illustrates an example result of the ML-based online control system's Linear and Rainflow forecasting models. As illustrated, the forecasting model 700 is missing some of the extreme values such as spike 710. The model may be turned into a binarized predictor by setting a threshold of operational cost whereby anything greater than the threshold would be True and anything less than the threshold would be False. Any period with a value above the threshold is deemed as profitable to participate, and any period with a value below the threshold is deemed to be unfavorable. In FIG. 7, the threshold 720 is set to 0, which means that the payout to participate is greater than battery degradation or not. The threshold 720 could also be set at different values, as desired. For example, if there are other additional costs, the threshold 720 can be set higher; if credit is obtained for participating, the threshold 720 could be set lower; if the additional cost/benefit is not constant, then the cost/benefit can be added as a feature in the ML model. As illustrated, after setting the threshold 720 to 0 and turning the prediction into a binarized classifier to predict when to participate in the regulation market, the results are quite promising. 91-95% accuracy can be achieved for Rainflow battery models and up to 99% for the illustrated Linear battery model.

ML-Based Online Control System

Figure 8:
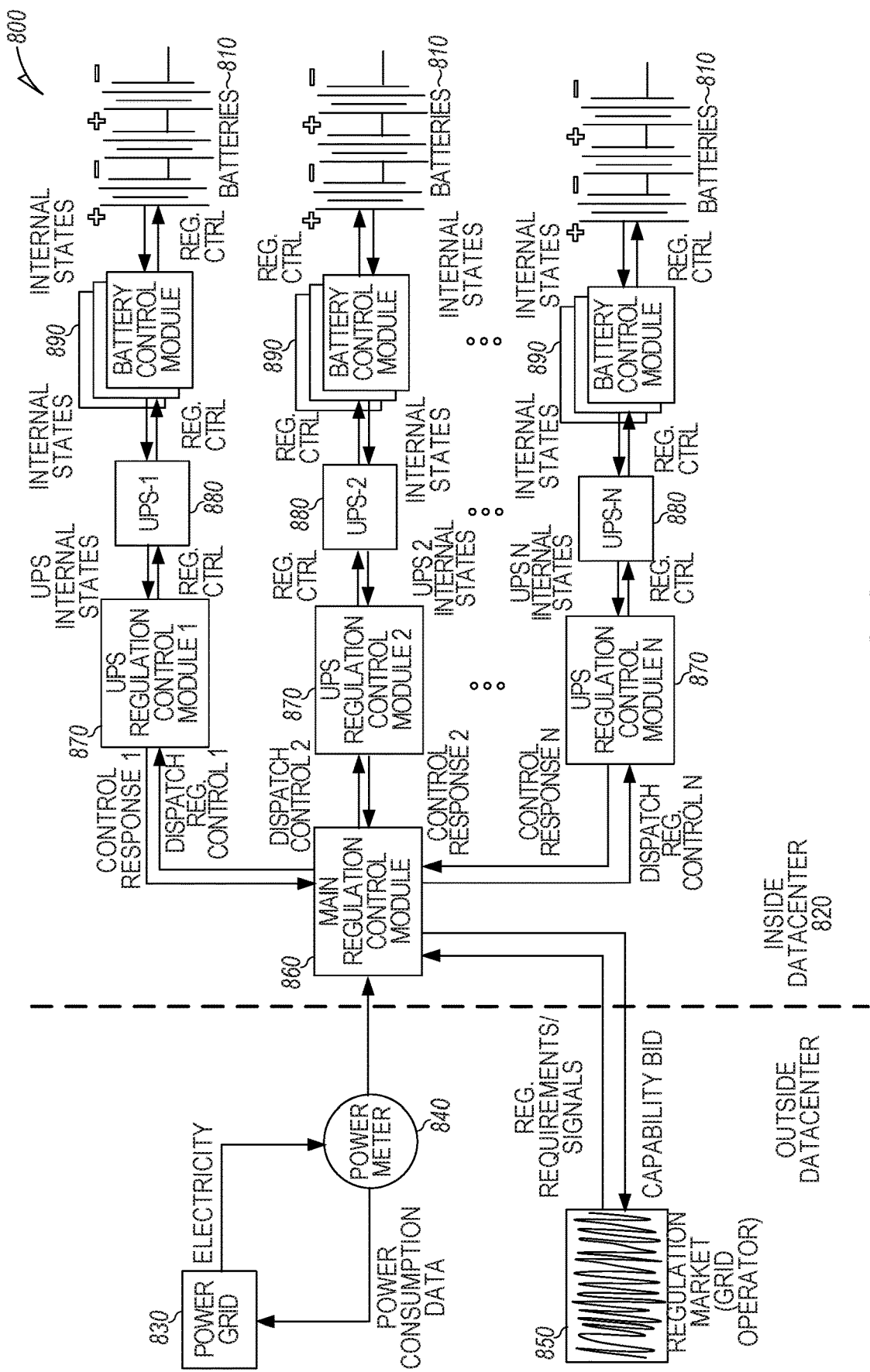
FIG. 8 illustrates a block diagram of an implementation of an ML-based online control system for providing regulation control signals to batteries in a datacenter.

FIG. 8 illustrates a sample diagram of an implementation of the ML-based online control system 800 for providing regulation controls to batteries 810 in a datacenter 820. As illustrated, all interactions of each datacenter 820 with the power grid 830 are hidden behind a power meter 840. The power meter 840 monitors the electrical power provided to the datacenter 820 and provides power consumption data back to the power grid 830 (e.g., for billing purposes). The datacenter 820 also receives frequency regulation control signals and market data from the grid operator 850. The datacenter's capability bid is provided to the grid operator 850 and follows the regulation signals as a unit. The grid operator 850 can monitor the datacenter's regulation response via the power meter 840 as power usages.

Within the datacenter 820, a main regulation control module 860 responds to the regulation signals and runs the afore-mentioned ML-based models to dispatch regulation control signals to each UPS regulation control module 870. In sample embodiments, a cascade of controllers is used to optimize control dispatch and to aggregated responses by controlling the battery management at the battery, UPS, and/or datacenter level. The capability (magnitude) and control signal to each UPS regulation control module 870 at the UPS level does not need to be the same but should sum up to the response of the main regulation control module 860. A regulation control signal is provided to each UPS 880 from the corresponding UPS regulation control module 870, and each UPS 880 dispatches a regulation control signal to the battery control modules 890, which selectively control the batteries 810. The control can be different for each battery 810, but the sum of them should equal the control dispatched at the UPS level. At each level, a separate optimization is run based on its received regulation signal and internal status (state of charge, temperature, compute load, etc.) of the control components. In the embodiment of FIG. 8, the datacenter load is treated as constant. However, it will be appreciated that load forecasting, balancing, and load throttling could also be applied to further optimize the load on the system.

Figure 9:
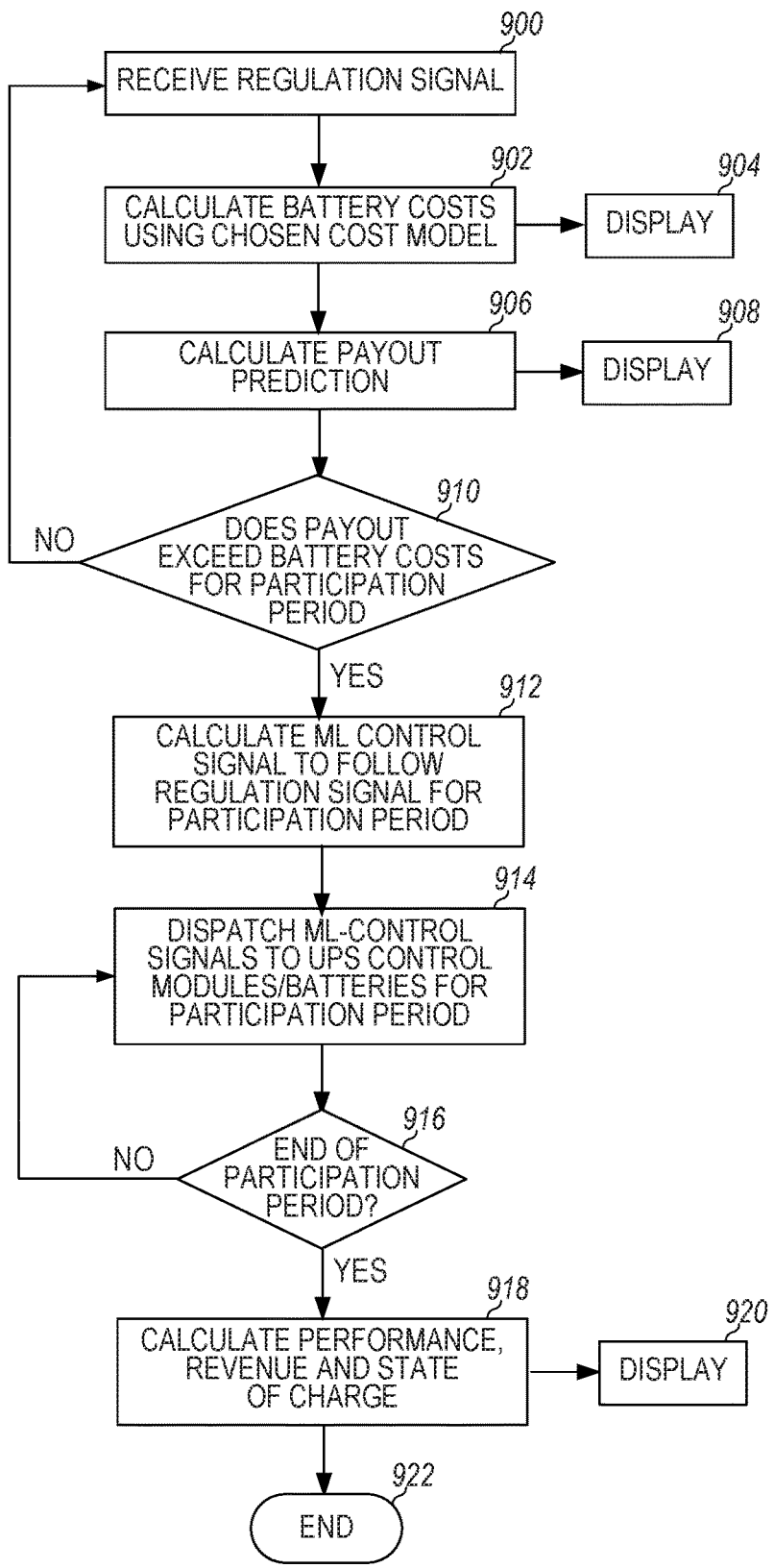
FIG. 9 illustrates a flow chart of a sample embodiment of the operation of the main regulation control module illustrated in FIG. 8.

FIG. 9 illustrates a sample embodiment of the operation of the main regulation control module 860. In sample embodiments, the illustrated operations are implemented in software and/or firmware of the processor of the main regulation control module 860. It will be appreciated that the main regulation control module 860 also performs other operations, such as determining the capability bid and distributing electricity to datacenter components, that are not part of this processing. Corresponding processing for generating the regulation control signals may be performed by the processors of the UPS regulation control modules 870 and/or battery control modules 890, as appropriate.

The main regulation control module 860 continuously receives the real-time regulation signal for the current participation period as indicated at 900. At 902, the main regulation control module 860 calculates the battery costs for a prospective participation period using the selected cost model. For example, the battery costs may be calculated using the Linear and/or or the Rainflow cost models described herein. However, it will be appreciated that other battery degradation cost models may be used. The results of the calculations are displayed on the dashboard display at 904.

The payout prediction for the prospective participation period is calculated at 906 and displayed on the dashboard display at 908. For example, the payout prediction is calculated using the LSTM (long short-term memory) based deep learning model 500 form input features to the model such as capability clearing price, performance clearing price, mileage ratio, performance score of previous period, and mean of the regulation signal amplitude as described herein with respect to FIG. 5 and FIG. 6.

At 910, the main regulation control module 860 determines whether the anticipated payout for the prospective participation period exceeds the calculated battery costs for the prospective participation period. If not, the main regulation control module 860 determines that it would not be profitable or cost-effective to participate in regulation of the grid during the prospective participation period. However, if the payout exceeds the set threshold for the battery costs for the prospective participation period, then the main regulation control module 860 prepares to move into a battery regulation mode to control the batteries 810 during the prospective participation period.

At 912, the main regulation control module 860 during the battery regulation mode calculates the ML-control signal to follow the regulation signal for the participation period. The calculated ML-control signal is dispatched to the UPS regulation control modules 870 and the battery control modules 890 at 914 for regulation of the charging/discharging of the batteries 810 during the participation period. The battery regulation is designed to provide stability to the electrical grid based on tracking of the regulation signal by the ML-control signal.

Once the participation period ends at 916, the regulation operators calculate the performance, revenue, and state of charge of the batteries 810 and sends the data back to the participant, who display the calculated information on the dashboard display at 920 before the process ends at 922.

It will be appreciated that the regulation signal is received at all times and that the calculations performed by the main regulation control module 860 may be performed continually or at discrete times. Also, the respective calculations may be presented to the dashboard display in a variety of display formats, including those described below with respect to FIGS. 10-22.

Dashboard

Figure 10A:
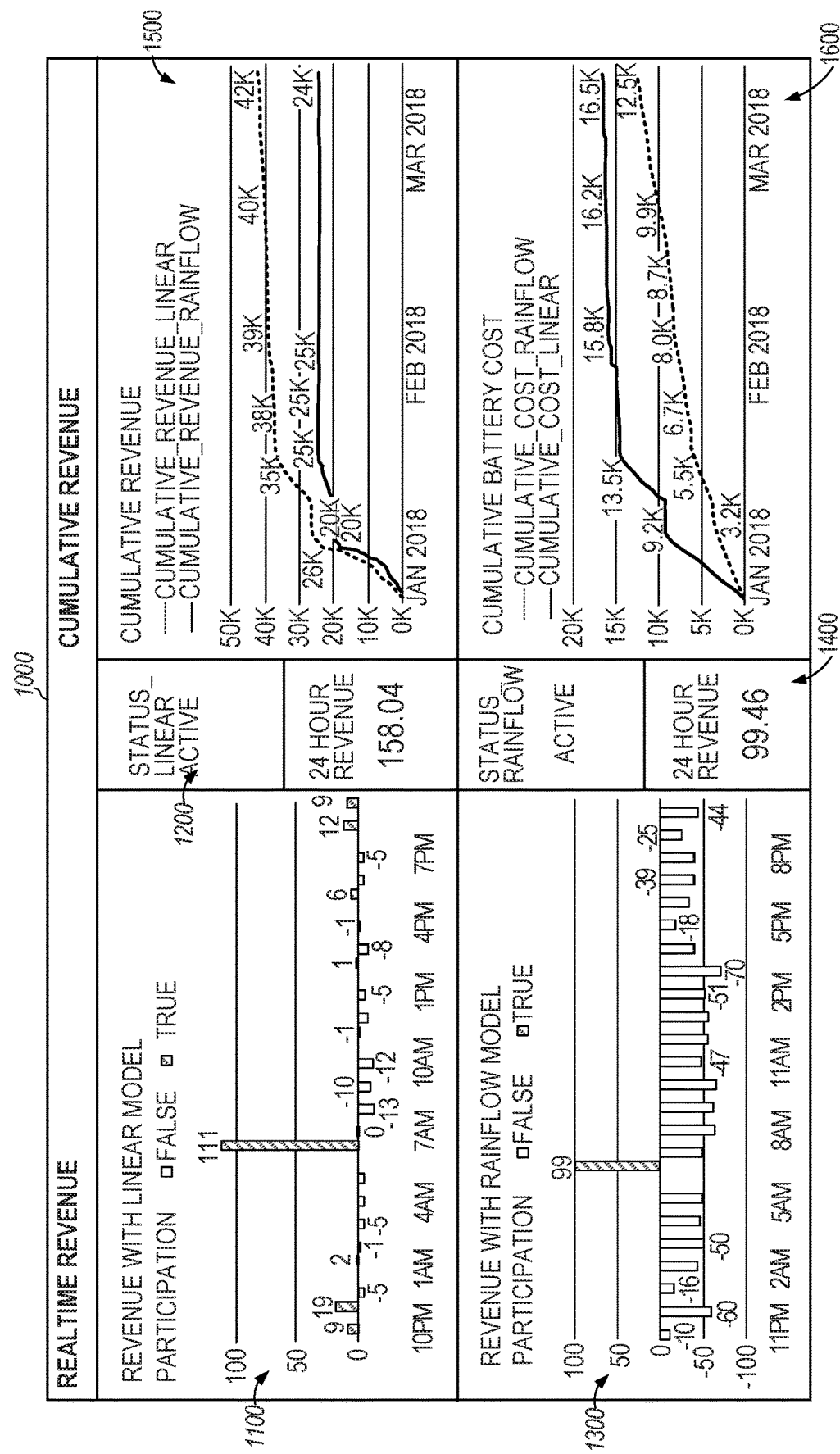
FIG. 10A illustrates a first screen that displays real-time and cumulative revenue and battery degradation cost modelling and FIG. 10B illustrates a second screen that displays performance and market data, the regulation signal, the battery response, and battery state of charge.
Figure 10B:
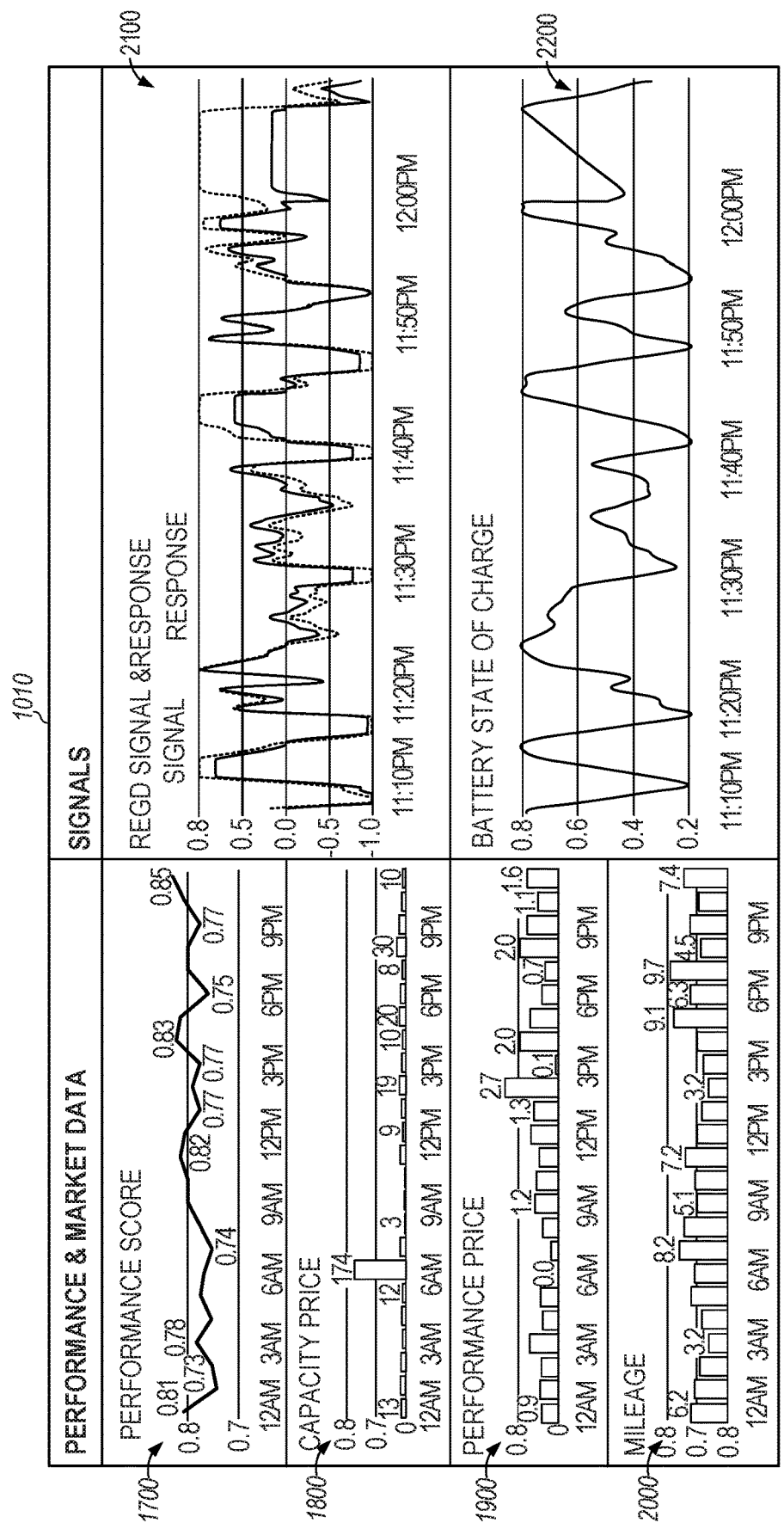

FIG. 10 illustrates a sample dashboard for monitoring operation of the frequency regulation energy market in a sample embodiment. The dashboard includes two screens. FIG. 10A illustrates a first screen 1000 that displays real-time and cumulative revenue data, while FIG. 10B illustrates a second screen 1010 that displays performance and market data, the regulation signal, the battery response, and state of charge as well as results of participation, revenue and battery cost modelling.

Figures 11, 12:
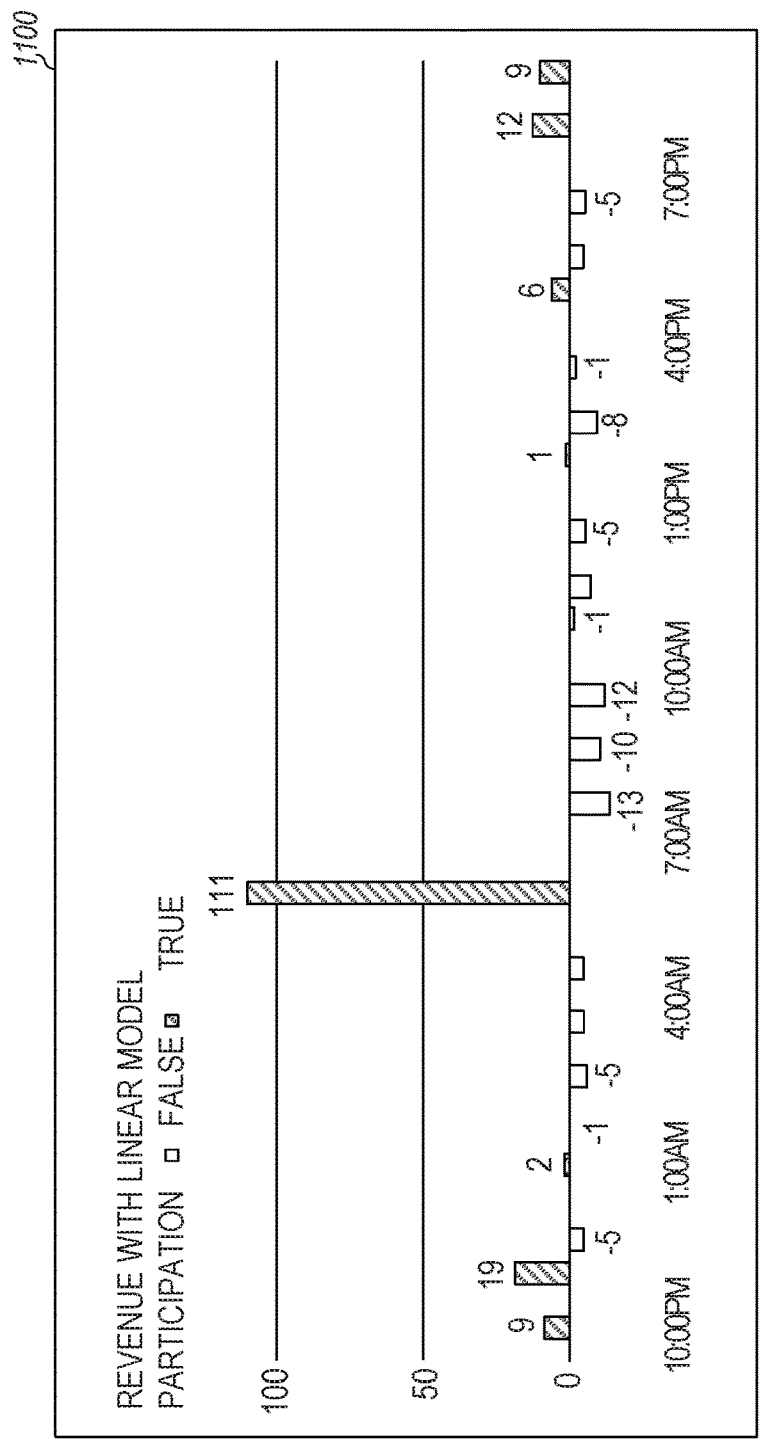
FIG. 11 illustrates a display of the Revenue With linear Model chart of FIG. 10A.
FIG. 12 illustrates a display of the Linear Model Current Status chart of FIG. 10A.

FIG. 11 illustrates the Revenue With Linear Model chart 1100 of FIG. 10A. As illustrated in FIG. 11, the Revenue With Linear Model chart 1100 shows real-time results of participation modelling using the Linear battery cost model adjustment to revenue. The X axis illustrates the last 24 hours of operation, while the Y axis illustrates the revenue in US dollars adjusted to battery cost calculated using the Linear degradation model. The bars are colored based on system participation during an hour. If the prediction model classifies an hour as profitable, the bid is placed on the market and the bar for this hour is colored a first color (e.g., blue), while hours classified as non-profitable are colored a second color (e.g., grey).

FIG. 12 illustrates the Linear Model Current Status chart 1200 of FIG. 10A. As illustrated in FIG. 12, a card 1210 shows the current status of the system operation that uses the Linear degradation model for battery cost calculation. The card 1210 shows the possible current status values as Active or Deactivated at {datetime value}. For example, the system may be deactivated when a negative daily revenue threshold is reached. A card 1220 shows the cumulated revenue in US dollars for previous 24 hours calculated using the Linear battery degradation cost model. Only hours when bids are placed and when the system operates on the market are summarized.

FIG. 13 illustrates the Revenue With Rainflow Model chart 1300 of FIG. 10A. As illustrated in FIG. 13, the Revenue With Rainflow Model chart 1300 shows real-time results of participation modelling using the Rainflow battery cost model adjustment to revenue. The X axis illustrates the last 24 hours of operation, while the Y axis illustrates the revenue in US dollars adjusted to battery cost calculated using the Rainflow degradation model. The bars are colored based on system participation during an hour. If the prediction model classifies an hour as profitable, the bid is placed on the market and the bar for this hour is colored a first color (e.g., orange), while hours classified as non-profitable are colored a second color (e.g., grey).

FIG. 14 illustrates the Rainflow Model Current Status chart 1400 of FIG. 10A. As illustrated in FIG. 14, a card 1410 shows the current status of the system operation that uses the Rainflow degradation model for battery cost calculation. The card 1410 shows the possible current status values as Active or Deactivated at {datetime value}. For example, the system may be deactivated when a negative daily revenue threshold is reached. A card 1420 shows the cumulated revenue in US dollars for previous 24 hours calculated using the Rainflow battery degradation cost model. Only hours when bids are placed and when the system operates on the market are summarized.

Figure 15:
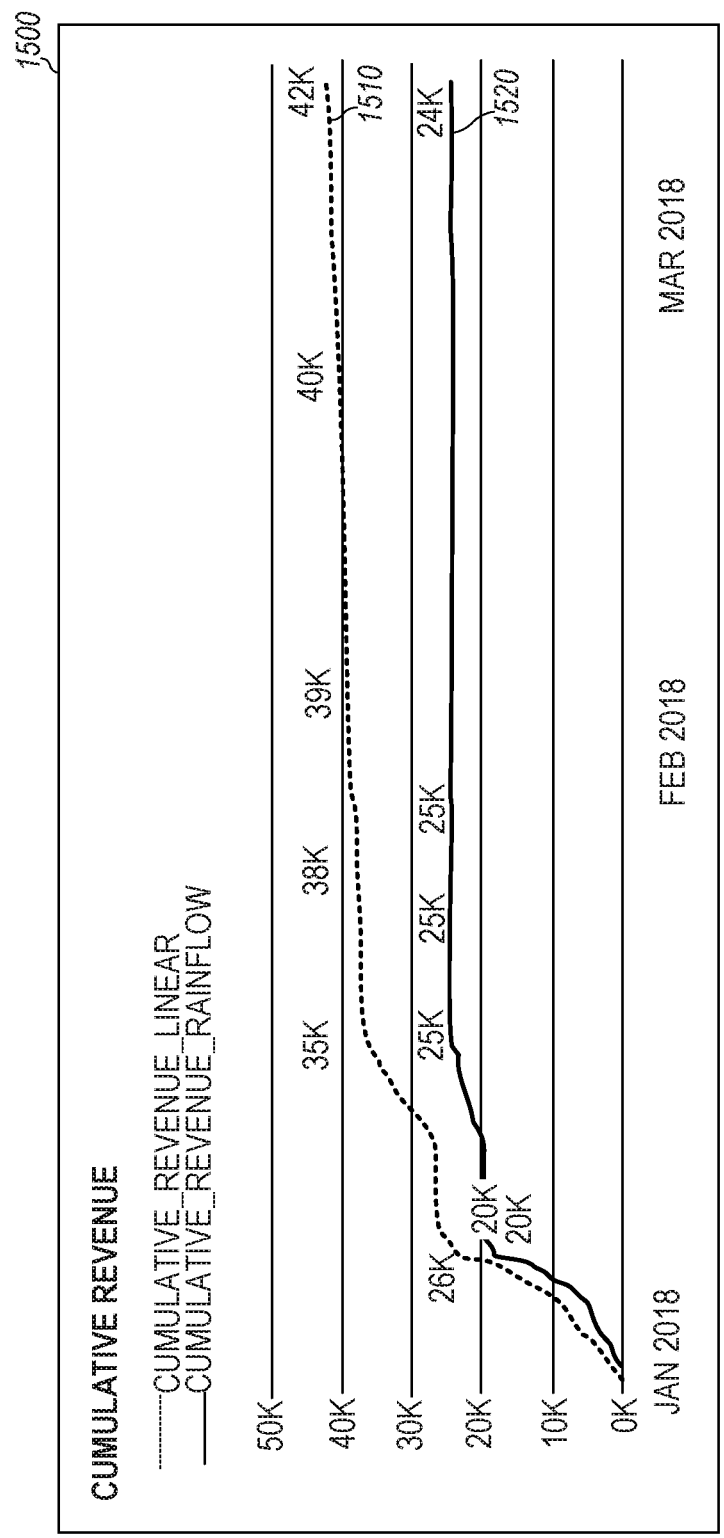
FIG. 15 illustrates a display of the Cumulative Revenue chart of FIG. 10A.

FIG. 15 illustrates the Cumulative Revenue chart 1500 of FIG. 10A. As illustrated in FIG. 15, the Cumulative Revenue chart 1500 shows cumulative results of operation on the frequency market using the two battery degradation cost models' adjustments to revenue. Only data for hours when the bids are placed and when a resource participates on the market are cumulated. The X axis illustrates a datetime starting from the first hour of system operation on the market up to current hour, while the Y axis illustrates the cumulated revenue in US dollars adjusted to the corresponding battery degradation cost model. The revenue data 1510 adjusted using the Linear battery degradation cost model is colored a first color (e.g., blue), while revenue data 1520 adjusted using the Rainflow battery degradation cost model is colored a second color (e.g., orange).

Figure 16:
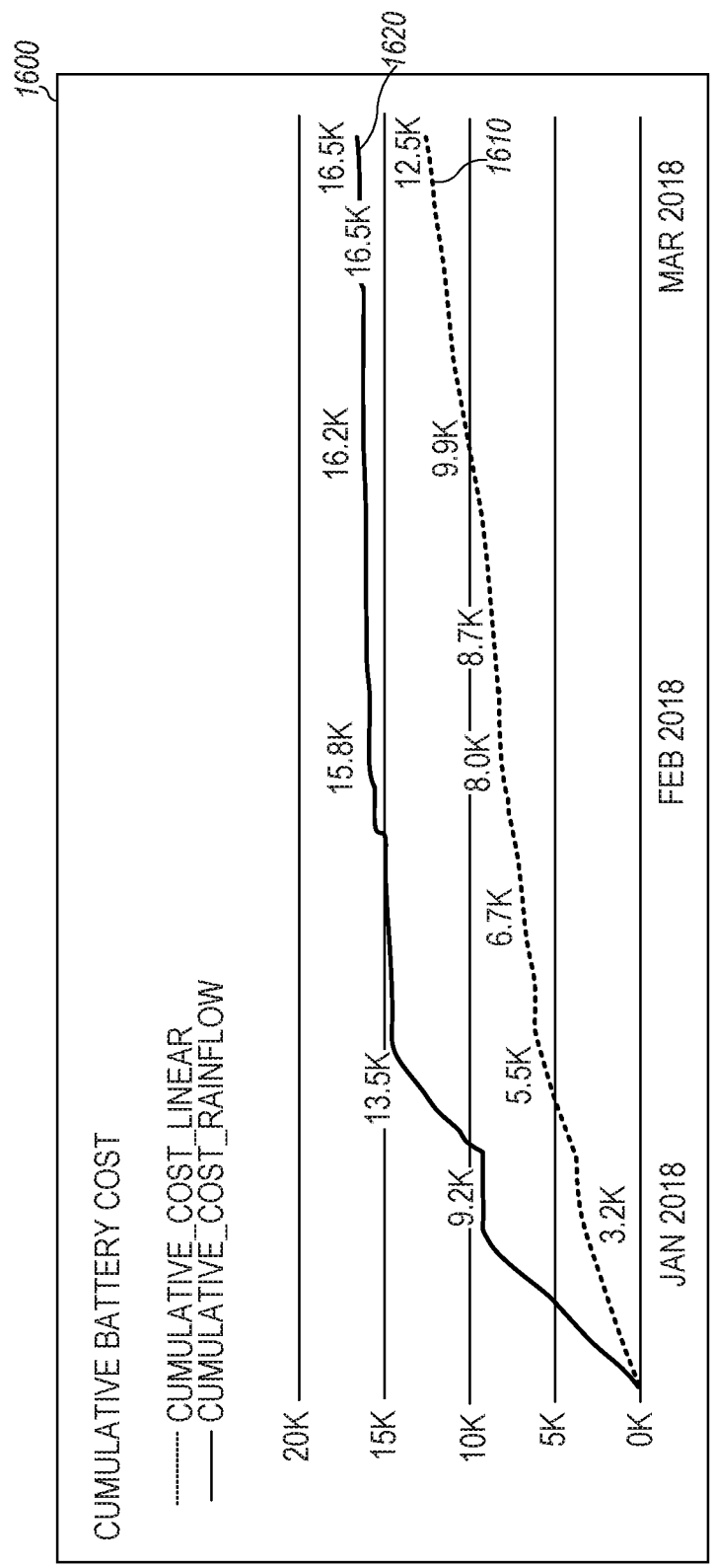
FIG. 16 illustrates a display of the Cumulative Battery Cost chart of FIG. 10A.

FIG. 16 illustrates the Cumulative Battery Cost chart 1600 of FIG. 10A. As illustrated in FIG. 16, the Cumulative Battery Cost chart 1600 shows cumulated battery degradation cost for the time of operation on the frequency market calculated with the two battery degradation cost models. Only data for hours when the bids are placed and when a resource participates on the market are cumulated. The X axis illustrates a datetime starting from the first hour of system operation on the market up to the current hour, while the Y axis illustrates the cumulated battery degradation cost in US dollars. The battery cost 1610 calculated using the Linear degradation model is colored a first color (e.g., blue), while the battery cost 1620 calculated using the Rainflow degradation model is colored a second color (e.g., orange).

Figure 17:
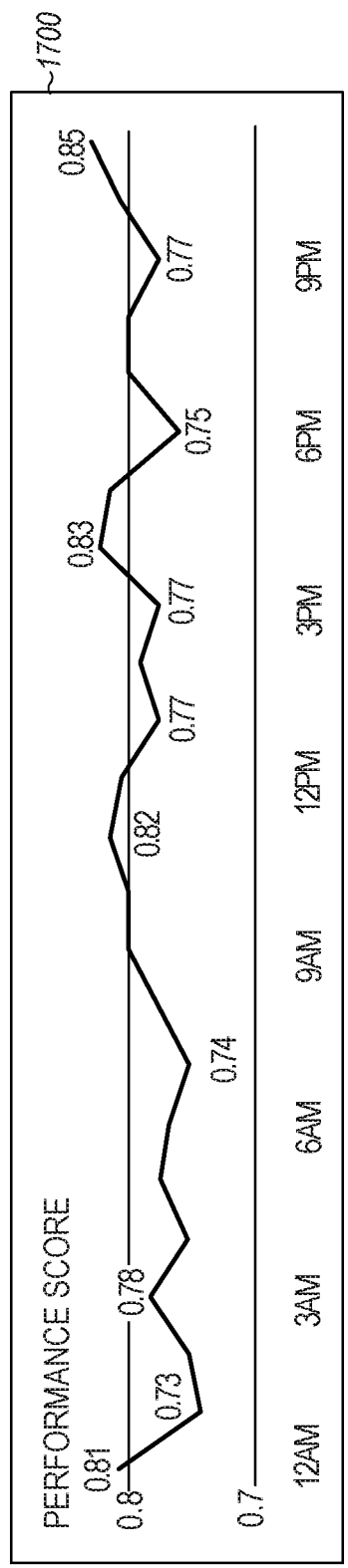
FIG. 17 illustrates a display of the Performance Score chart of FIG. 10B.

FIG. 17 illustrates the Performance Score chart 1700 of FIG. 10B. As illustrated in FIG. 17, the Performance Score chart 1700 shows the performance score of the resource for the previous 24 hours. The X axis illustrates the last 24 hours of operation, while the Y axis illustrates the performance score on a scale from 0 to 1. As noted above, the performance score depends on delay, accuracy and precision of the resource response for the RegD signal.

Figure 18:
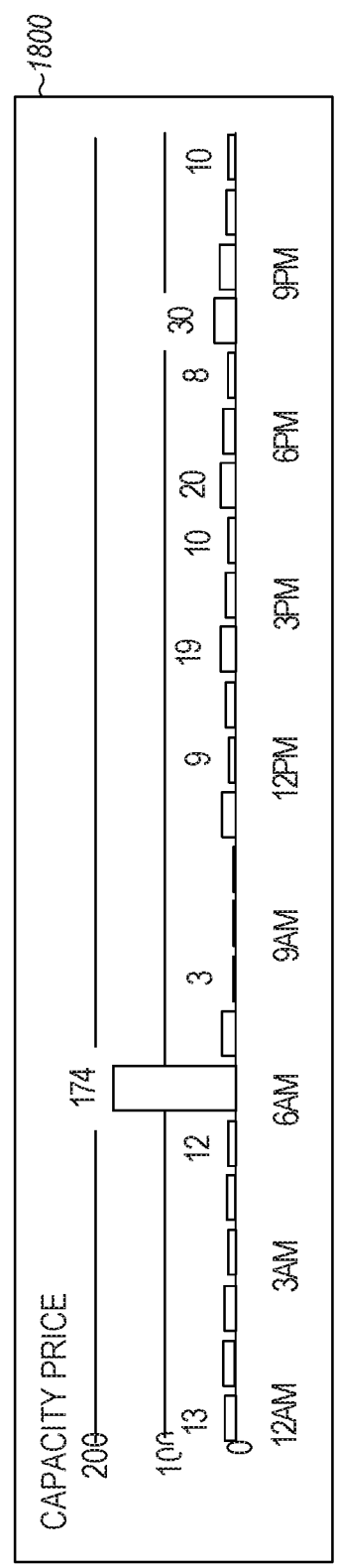
FIG. 18 illustrates a display of the Capacity Price chart of FIG. 10B.

FIG. 18 illustrates the Capacity Price chart 1800 of FIG. 10B. As illustrated in FIG. 18, the Capacity Price chart 1800 shows regulation market clearance capacity price (RMCCP) for 1 MWatt of capacity set by the energy market operator for the previous 24 hours. The X axis illustrates the last 24 hours of operation, while the Y axis illustrates the capacity price per 1 MW in US dollars.

Figure 19:
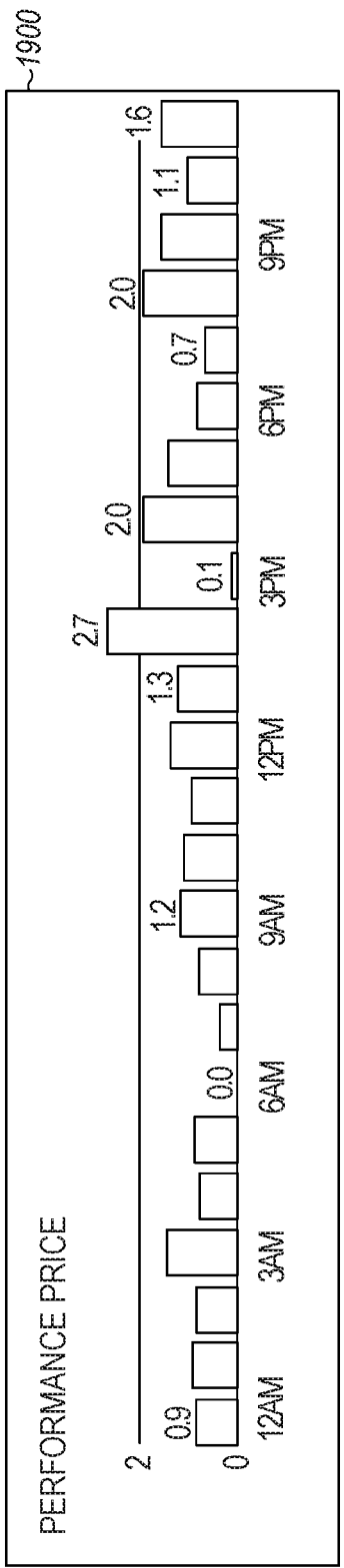
FIG. 19 illustrates a display of the Performance Price chart of FIG. 10B.

FIG. 19 illustrates the Performance Price chart 1900 of FIG. 10B. As illustrated in FIG. 19, the Performance Price chart 1900 shows the regulation market clearance performance price (RMCPC) set by energy market operator for the previous 24 hours. The X axis illustrates the last 24 hours of operation, while the Y axis illustrates the performance price per 1 MW of capacity that participates in the regulation market in US dollars.

Figure 20:
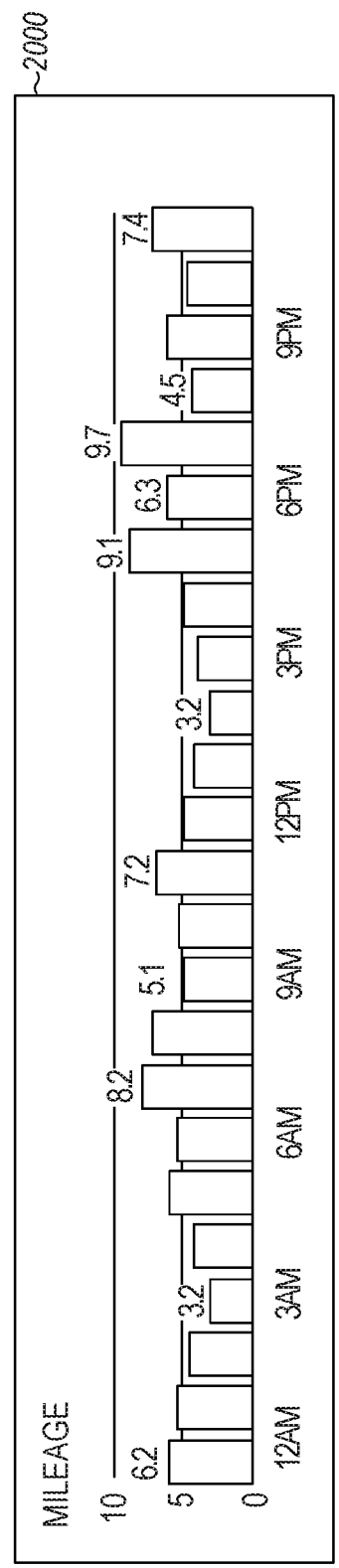
FIG. 20 illustrates a display of the Mileage chart of FIG. 10B.

FIG. 20 illustrates the Mileage chart 2000 of FIG. 10B. As illustrated in FIG. 19, the Mileage chart 2000 shows mileage that a resource of 1 MW capacity performs during an hour for the previous 24 hours. The X axis illustrates the last 24 hours of operation, while the Y axis illustrates the mileage per 1 MW of resource capacity that participates in the regulation market. By way of example, for an hour with 8 mileage, a 1 MW assigned resource will move up and down a total of 8 MW.

Figure 21:
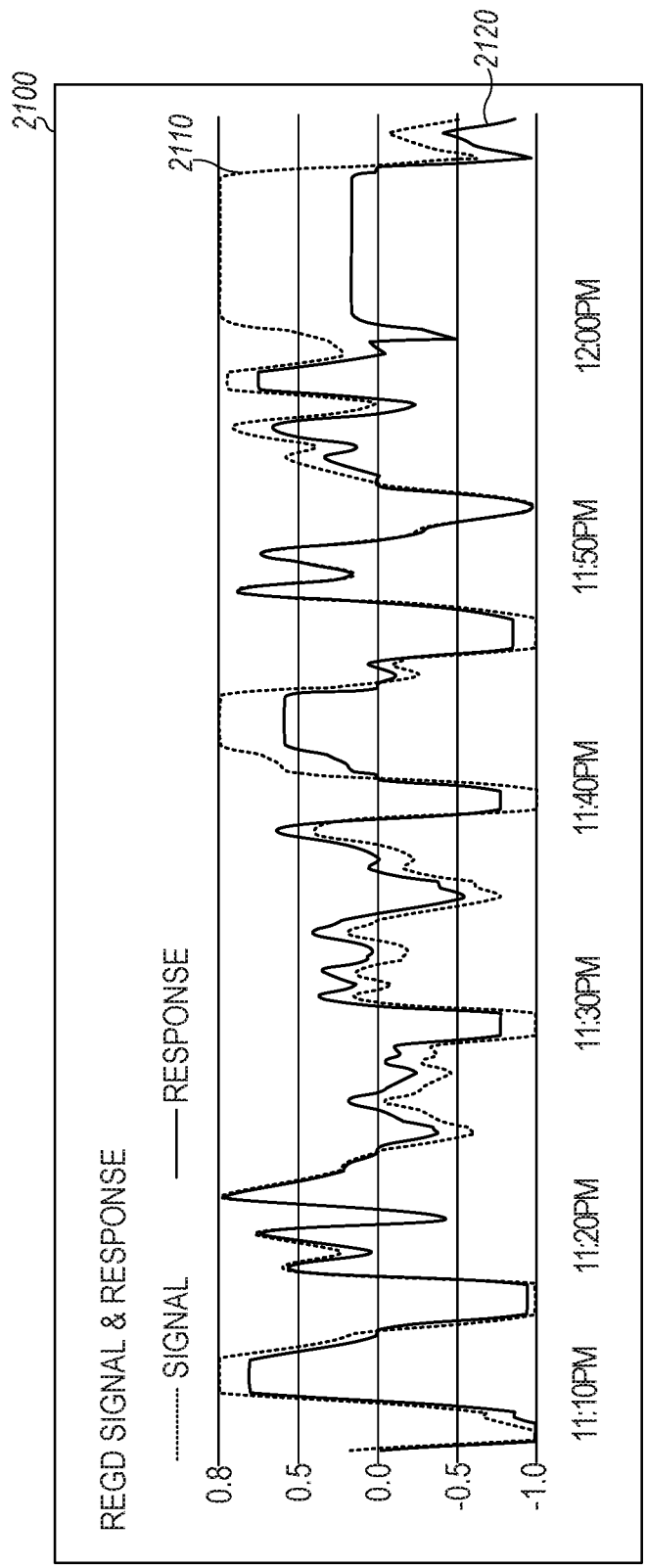
FIG. 21 illustrates a display of the RegD Signal and Response chart of FIG. 10B.

FIG. 21 illustrates the RegD Signal and Response chart 2100 of FIG. 10B. As illustrated in FIG. 21, the RegD Signal and Response chart 2100 shows the RegD regulation signal issued by the energy market operator as well as the resource response for the signal. The X axis illustrates the last hour of operation, while the Y axis illustrates the RegD signal and a resource response on a scale from −1 to 1 with 2 seconds frequency. The RegD signal 2110 is colored in a first color (e.g., red), while the resource response 2120 is colored in a second color (e.g., blue).

Figure 22:
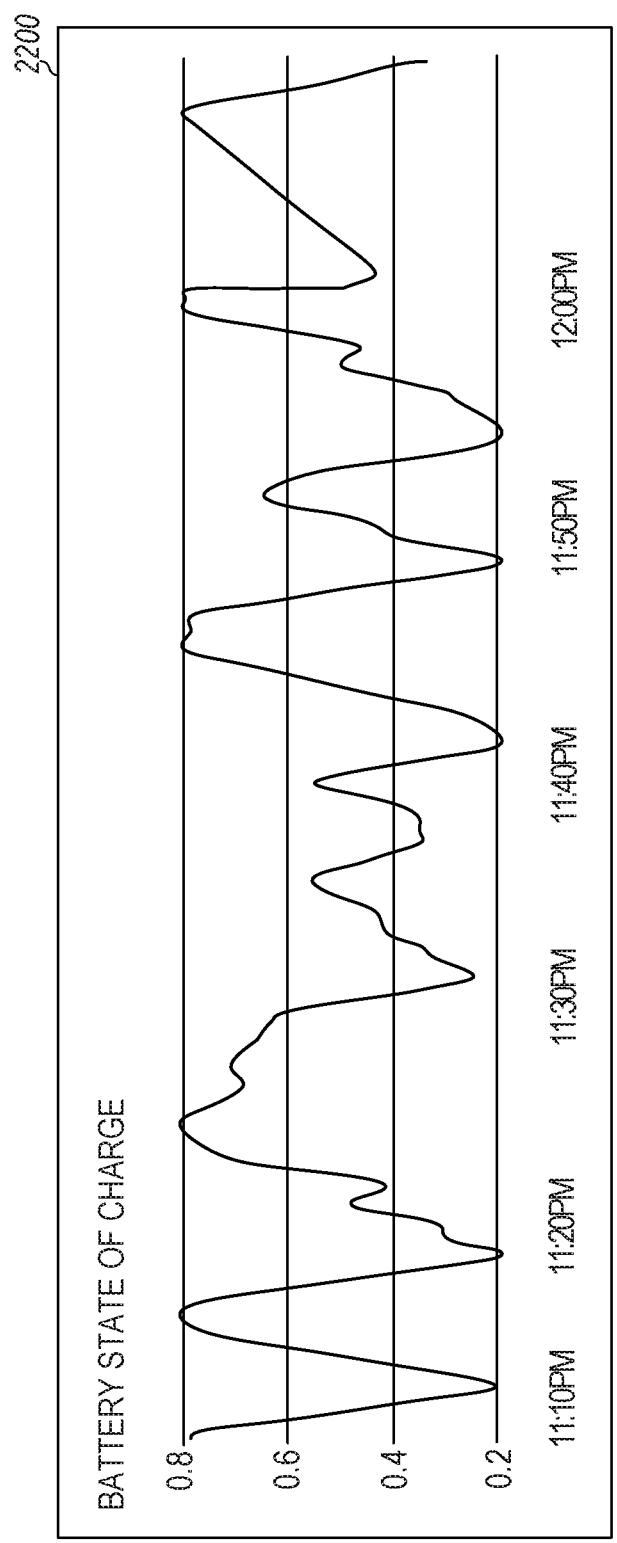
FIG. 22 illustrates a display of the Battery State of Charge chart of FIG. 10B.

FIG. 22 illustrates the Battery State of Charge chart 2200 of FIG. 10B. As illustrated in FIG. 22, the Battery State of Charge chart 2200 shows the state of charge of the battery while following the RegD signal. Limits of 0.2-0.8 are applied as the technical requirement for battery life consideration. The X axis illustrates the last hour of operation, while the Y axis illustrates the battery state of charge after the response to the RegD signal on a scale from 0.2 to 0.8 with 2 seconds frequency.

The system and method described herein has significant importance in terms of both the economics and sustainability of datacenter operation. The battery utilization described herein represents a significant opportunity to offset the running energy costs.

System Configuration

Techniques described herein may be used with one or more of the computer systems described herein and/or with one or more other systems. For example, the various procedures described herein may be implemented with hardware or software, or a combination of both. For example, the processor, memory, storage, output device(s), input device(s), and/or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 23:
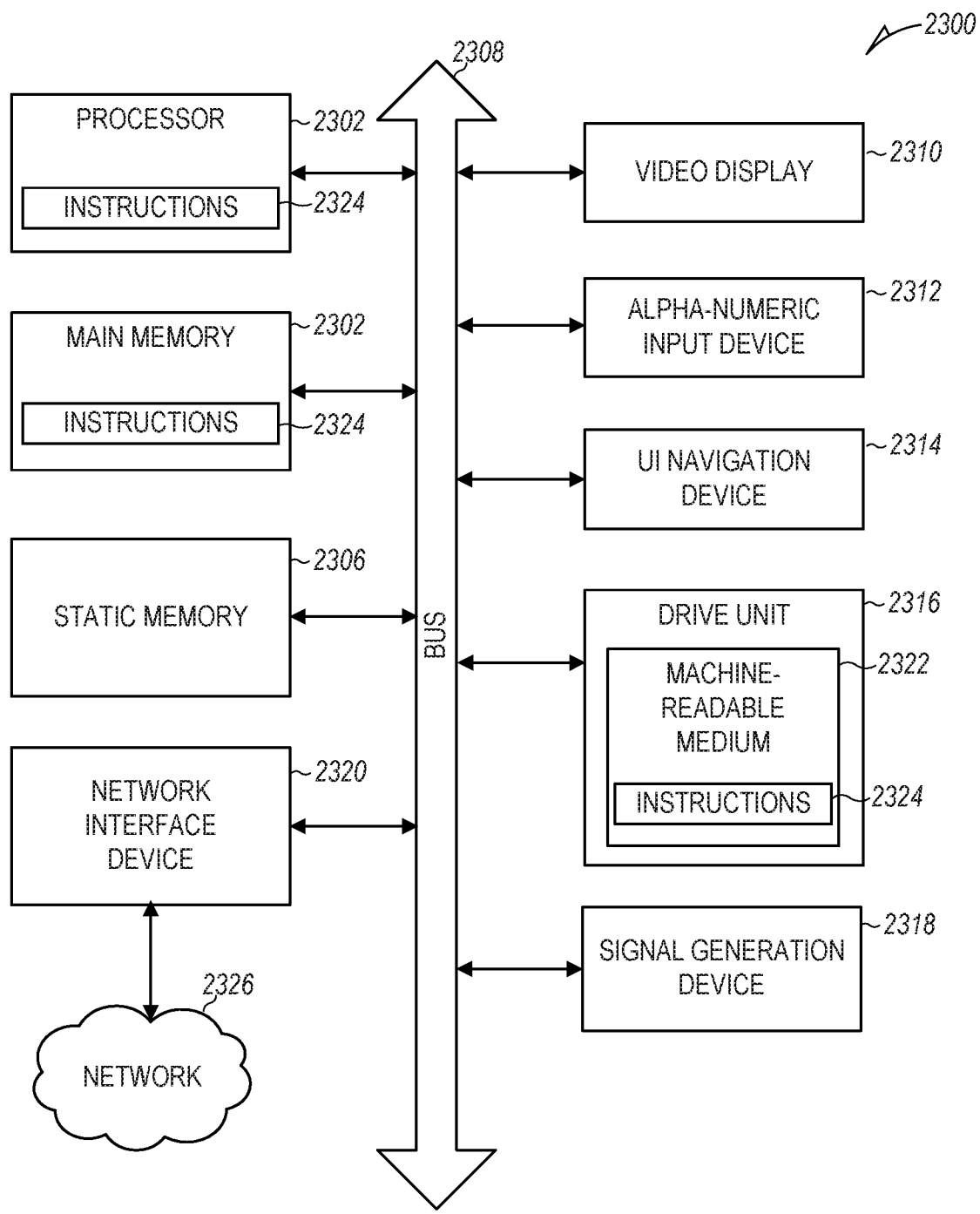
FIG. 23 illustrates a block diagram of an example of a machine upon which one or more embodiments may be implemented.

FIG. 23 illustrates a block diagram of an example of a machine 2300 upon which one or more embodiments of the main regulation control module 860 may be implemented. In alternative embodiments, the machine 2300 may operate as a standalone device or may be connected (e.g., networked) to other machines. In a networked deployment, the machine 2300 may operate in the capacity of a server machine, a client machine, or both in server-client network environments. In an example, the machine 2300 may act as a peer machine in peer-to-peer (P2P) (or other distributed) network environment. In sample embodiments, the machine 2300 may be used in embodiments of the collaboration server 220 as well as the user devices 230 (FIG. 2) and may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 2300 may serve as a workstation, a front-end server, or a back-end server of a communication system. Machine 2300 may implement the methods described herein (e.g., FIGS. 5, 6, and 9) by running software that includes instructions that, when processed, implement the methods described herein. Further, while only a single machine 2300 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g, programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2300 may include a hardware processor 2302 (e.g., a central processing unit (CPU), a graphics processing unit (GPU), a hardware processor core, or any combination thereof), a main memory 2304 and a static memory 2306, some or all of which may communicate with each other via an interlink (e.g., bus) 2308. The machine 2300 may further include a display unit 2310 (shown as a video display), an alphanumeric input device 2312 (e.g., a keyboard), and a user interface (UI) navigation device 2314 (e.g., a mouse or pen). In an example, the display unit 2310, input device 2312 and UI navigation device 2314 may be a touch screen display. The machine 2300 may additionally include a mass storage device (e.g., drive unit) 2316, a signal generation device 2318 (e.g., a speaker), and a network interface device 2320. The machine 2300 may include an output controller 2324, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 2316 may include a machine readable medium 2322 on which is stored one or more sets of data structures or instructions 2324 (e.g., software) embodying or utilized by any one or more of the techniques or functions described herein. The instructions 2324 may also reside, completely or at least partially, within the main memory 2304, within static memory 2306, or within the hardware processor 2302 during execution thereof by the machine 2300. In an example, one or any combination of the hardware processor 2302, the main memory 2304, the static memory 2306, or the drive unit 2316 may constitute machine readable media.

While the machine readable medium 2322 is illustrated as a single medium, the term "machine readable medium" may include a single medium or multiple media (e.g., a centralized or distributed database, and/or associated caches and servers) configured to store the one or more instructions 2324. The term "machine readable medium" may include any medium that is capable of storing, encoding, or carrying instructions for execution by the machine 2300 and that cause the machine 2300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 2324 may further be transmitted or received over communications network 2326 using a transmission medium via the network interface device 2320. The machine 2300 may communicate with one or more other machines utilizing any one of several transfer protocols (e.g., frame relay, internet protocol (IP), transmission control protocol (TCP), user datagram protocol (UDP), hypertext transfer protocol (HTTP), etc). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2320 may include one or more physical jacks (e.g., Ethernet, coaxial, or phone jacks) or one or more antennas to connect to the communications network 2326. In an example, the network interface device 2320 may include a plurality of antennas to wirelessly communicate using at least one of single-input multiple-output (SIMO), multiple-input multiple-output (MEMO), or multiple-input single-output (MISO) techniques. In some examples, the network interface device 2320 may wirelessly communicate using Multiple User MIMO techniques.

Certain embodiments are described herein as numbered examples 1, 2, 3, etc. These numbered examples are provided as examples only and do not limit the subject technology.

Example 1 is a computer-implemented method of using a battery to stabilize a regional power grid, comprising: monitoring a frequency regulation signal from the regional power grid and market conditions for obtaining power from the regional power grid; predicting from the frequency regulation signal and market conditions a future beneficial period when the battery may be exposed to the regional power grid to charge/discharge power in accordance with the frequency regulation signal to stabilize the regional power grid through participation in the regulation of the regional power grid; calculating a regulation control signal that tracks the frequency regulation signal during the future beneficial period; and during the future beneficial period, charging/discharging the battery in response to the regulation control signal.

Example 2 is a method as in Example 1, wherein the market conditions comprise at least one of (1) a discrepancy between available power from the regional power grid and a load on the regional power grid and (2) a performance score that measures how well a participant in regulation of the regional power grid performs frequency regulation services.

Example 3 is a method as in any preceding Example, wherein the battery comprises backup batteries of a datacenter.

Example 4 is a method as in any preceding Example, further comprising during the future beneficial period, in response to the regulation control signal, performing at least one of adjusting power usage of a backup generator, adjusting cooling and ambient temperatures of the datacenter, and adjusting load balancing of computing operations of the datacenter.

Example 5 is a method as in any preceding Example, wherein predicting the future beneficial period comprises predicting a benefit of participation in regulation of the regional power grid during a prospective participation period relative to costs of participation in regulation of the regional power grid during the prospective participation period.

Example 6 is a method as in any preceding Example, wherein the costs of participation in regulation of the regional power grid during the prospective participation period include predicted battery degradation due to charging and discharging of the battery as determined using a battery degradation cost model.

Example 7 is a method as in any preceding Example, wherein predicting the future beneficial period comprises predicting at least one of a black-out event and a grid equipment failure event.

Example 8 is a method as in any preceding Example, further comprising providing a dashboard that displays to a user at least the predicted future beneficial period for participation in regulation of the regional power grid and actual market payout for participation in regulation of the regional power grid during a prior participation period.

Example 9 is a method as in any preceding Example, wherein predicting the future beneficial period comprises using a machine learning prediction model to forecast energy-market stability of the regional power grid from at least the market conditions.

Example 10 is a method as in any preceding Example, wherein the prediction model comprises a long short-term memory machine learning based prediction model that forecasts regulation service payout from energy market-specific historical data.

Example 11 is a system for regulating the charge/discharge of a battery to stabilize a regional power grid, comprising a battery; a regulation control module that monitors a frequency regulation signal from the regional power grid and market conditions for obtaining power from the regional power grid, the regulation control module including a machine learning module that predicts from the frequency regulation signal and market conditions a future beneficial period when the battery may be exposed to the regional power grid to charge/discharge power in accordance with the frequency regulation signal to stabilize the regional power grid through participation in the regulation of the regional power grid, the regulation control module further comprising a machine learning module that calculates a regulation control signal that tracks the frequency regulation signal during the future beneficial period and that outputs the regulation control signal during the future beneficial period to manage charging/discharging of the battery; and at least one battery control module that manages the charging/discharging of the battery in response to the regulation control signal to selectively withdraw/apply power from/to the regional power grid.

Example 12 is a system as in Example 11, wherein the market conditions comprise at least one of (1) a discrepancy between available power from the regional power grid and a load on the regional power grid and (2) a performance score that measures how well a participant in regulation of the regional power grid performs frequency regulation services.

Example 13 is a system as in Examples 11-12, wherein the battery comprises backup batteries of a datacenter.

Example 14 is a system as in Examples 11-13, wherein the regulation control module further adjusts at least one of power usage of a backup generator, cooling and ambient temperatures of the datacenter, and load balancing of computing operations of the datacenter during the future beneficial period in response to the regulation control signal.

Example 15 is a system as in Examples 11-14, wherein the machine learning module that predicts the future beneficial period predicts a benefit of participation in regulation of the regional power grid during a prospective participation period relative to costs of participation in regulation of the regional power grid during the prospective participation period.

Example 16 is a system as in Examples 11-15, wherein the machine learning module that predicts the future beneficial period calculates the costs of participation in regulation of the regional power grid during the prospective participation period by using a battery degradation cost model to predict battery degradation due to charging and discharging of the battery during the prospective participation period.

Example 17 is a system as in Examples 11-16, wherein the machine learning module that predicts the future beneficial period predicts at least one of a black-out event and a grid equipment failure event.

Example 18 is a system as in Examples 11-17, further comprising a dashboard display 1 that displays to a user at least the predicted future beneficial period for participation in regulation of the regional power grid and actual market payout for participation in regulation of the regional power grid during a prior participation period.

Example 19 is a system as in Examples 11-18, wherein the machine learning module that predicts the future beneficial period comprises a long short-term memory machine learning based prediction model that forecasts regulation service payout from enemy market-specific historical data.

Example 20 is a non-transitory computer readable medium having instructions stored thereon that when executed by one or more processors implements a method of using a battery to stabilize a regional power grid, comprising: instructions for monitoring a frequency regulation signal from the regional power grid and market conditions for obtaining power from the regional power grid; instructions for calculating battery degradation costs using a battery degradation cost model for charging/discharging the battery during a future beneficial period; instructions for calculating a payout prediction from the frequency regulation signal and market conditions for participation in stabilizing the regional power grid through participation in the regulation of the regional power grid during the future beneficial period; instructions for determining when the payout prediction exceeds the battery degradation costs during the future beneficial period; instructions for calculating a regulation control signal that tracks the frequency regulation signal during the future beneficial period; and instructions for dispatching battery regulation signals to the battery during the future beneficial period for charging/discharging the battery front/to the regional power grid in response to the calculated regulation control signal.

Alternative implementations of the system as described herein are contemplated. For example, the system as described herein may be implemented in other configurations besides a datacenter, such as dedicated battery storage facilities and renewable energy facilities. Thus, the system as described herein is not to be limited to the systems described in specific examples. These and other implementations are included within the context of the disclosed embodiments as set forth in the following claims.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Also, although the subject matter has been described in language specific to structural features and/or methodological acts, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A computer-implemented method of using a battery to stabilize a regional power grid, comprising:
   monitoring a frequency regulation signal from the regional power grid and market conditions for obtaining power from the regional power grid;
   predicting from the frequency regulation signal and market conditions a future period when the battery may be exposed to the regional power grid to at least one of charge or discharge power in accordance with a future frequency regulation signal to stabilize the regional power grid through participation in the regulation of the regional power grid;
   calculating a regulation control signal that tracks the future frequency regulation signal during the future period; and during the future period, at least one of charging or discharging the battery in response to the regulation control signal.

2. The method of claim 1, wherein the market conditions comprise at least one of (1) a discrepancy between available power from the regional power grid and a load on the regional power grid, or (2) a performance score that measures how well a participant in regulation of the regional power grid performs frequency regulation services.

3. The method of claim 1, wherein the battery comprises backup batteries of a datacenter.

4. The method of claim 3, further comprising during the future period, in response to the regulation control signal, performing at least one of adjusting power usage of a backup generator, adjusting cooling and ambient temperatures of the datacenter, and adjusting load balancing of computing operations of the datacenter.

5. The method of claim 3, wherein predicting the future period comprises predicting a benefit of participation in regulation of the regional power grid during a prospective participation period relative to costs of participation in regulation of the regional power grid during the prospective participation period.

6. The method of claim 5, wherein the costs of participation in regulation of the regional power grid during the prospective participation period include predicted battery degradation due to charging and discharging of the battery as determined using a battery degradation cost model.

7. The method of claim 5, wherein predicting the future period comprises predicting at least one of a black-out event and a grid equipment failure event.

8. The method of claim 1, further comprising providing a dashboard that displays to a user at least the predicted future period for participation in regulation of the regional power grid and actual market payout for participation in regulation of the regional power grid during a prior participation period.

9. The method of claim 1, wherein predicting the future period comprises using a machine learning prediction model to forecast energy-market stability of the regional power grid from at least the market conditions.

10. The method of claim 9, wherein the prediction model comprises a long short-term memory machine learning based prediction model that forecasts regulation service payout from energy market-specific historical data.

11. A system for regulating the charge and discharge of a battery to stabilize a regional power grid, comprising:
  a battery;
  a regulation control module that monitors a frequency regulation signal from the regional power grid and market conditions for obtaining power from the regional power grid,
  the regulation control module including a machine learning module that predicts from the frequency regulation signal and market conditions a future period when the battery may be exposed to the regional power grid to at least one of charge or discharge power in accordance with a future frequency regulation signal to stabilize the regional power grid through participation in the regulation of the regional power grid,
  the regulation control module further comprising a machine learning module that calculates a regulation control signal that tracks the future frequency regulation signal during the future period and that outputs the regulation control signal during the future period to manage charging and discharging of the battery; and
  at least one battery control module that manages at least one of the charging or discharging of the battery in response to the regulation control signal to selectively withdraw power from or apply power to the regional power grid.

12. The system of claim 11, wherein the market conditions comprise at least one of (1) a discrepancy between available power from the regional power grid and a load on the regional power grid, or (2) a performance score that measures how well a participant in regulation of the regional power grid performs frequency regulation services.

13. The system of claim 11, wherein the battery comprises backup batteries of a datacenter.

14. The system of claim 13, wherein the regulation control module further adjusts at least one of power usage of a backup generator, cooling and ambient temperatures of the datacenter, and load balancing of computing operations of the datacenter during the future period in response to the regulation control signal.

15. The system of claim 13, wherein the machine learning module that predicts the future period predicts a benefit of participation in regulation of the regional power grid during a prospective participation period relative to costs of participation in regulation of the regional power grid during the prospective participation period.

16. The system of claim 15, wherein the machine learning module that predicts the future period calculates the costs of participation in regulation of the regional power grid during the prospective participation period by using a battery degradation cost model to predict battery degradation due to charging and discharging of the battery during the prospective participation period.

17. The system of claim 15, wherein the machine learning module that predicts the future period predicts at least one of a black-out event and a grid equipment failure event.

18. The system of claim 11, further comprising a dashboard display 1 that displays to a user at least the predicted future period for participation in a regulation service of the regional power grid and actual market payout for participation in the regulation service of the regional power grid after a participation period.

19. The system of claim 11, wherein the machine learning module that predicts the future period comprises a long short-term memory machine learning based prediction model that forecasts regulation service payout from energy market-specific historical data.

20. A non-transitory computer readable medium having instructions stored thereon that when executed by one or more processors implements a method of using a battery to stabilize a regional power grid, comprising:
  instructions for monitoring a frequency regulation signal from the regional power grid and market conditions for obtaining power from the regional power grid;
  instructions for calculating battery degradation costs using a battery degradation cost model for at least one of charging or discharging the battery during a future period;
  instructions for calculating a payout prediction from the frequency regulation signal and market conditions for participation in stabilizing the regional power grid through participation in the regulation of the regional power grid during the future period;
  instructions for determining when the payout prediction exceeds the battery degradation costs during the future period;

instructions for calculating a regulation control signal that tracks a future frequency regulation signal during the future period; and instructions for dispatching battery regulation signals to the battery during the future period for at least one of charging or discharging the battery from or to the regional power grid in response to the calculated regulation control signal.

* * * * *